(12) United States Patent
Sekizuka

(10) Patent No.: US 11,267,431 B2
(45) Date of Patent: Mar. 8, 2022

(54) OCCUPANT PROTECTIVE APPARATUS INCLUDING AN INFLATABLE PARTITION

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 16/829,465

(22) Filed: Mar. 25, 2020

(65) Prior Publication Data
US 2020/0384940 A1   Dec. 10, 2020

(30) Foreign Application Priority Data
Jun. 4, 2019   (JP) .............................. JP2019-104731

(51) Int. Cl.
*B60R 21/232*   (2011.01)
*B60R 21/0132*   (2006.01)
(Continued)

(52) U.S. Cl.
CPC ........ *B60R 21/232* (2013.01); *B60R 21/0132* (2013.01); *B60R 21/0134* (2013.01);
(Continued)

(58) Field of Classification Search
CPC ............ B60R 21/0132; B60R 21/0134; B60R 21/026; B60R 21/06; B60R 21/08;
(Continued)

(56) References Cited

U.S. PATENT DOCUMENTS 5,238,282 A * 8/1993 Watson .............. B60H 1/00592
296/24.41
6,105,653 A * 8/2000 Armstrong ......... B60H 1/00592
160/120
(Continued)

FOREIGN PATENT DOCUMENTS

FR   2985480 A1 *  7/2013  ............... B60N 2/91
FR   3070940 A1 *  3/2019  ......... B60R 13/0823
(Continued)

OTHER PUBLICATIONS

U.S. Appl. No. 16/861,607, filed Apr. 29, 2020; Inventor: Makoto Sekizuka.

*Primary Examiner* — Laura Freedman
(74) *Attorney, Agent, or Firm* — Dinsmore & Shohl LLP

(57) ABSTRACT

In a shielding state, a partition extends from an upper portion to a lower portion of a cabin in such a manner as to partition a space between a pair of opposing vehicle seats. In the case where the partition is in the shielding state during a collision of a vehicle, the partition is inflated in a vehicle longitudinal direction by gas supplied from an inflator that is actuated when a collision detection sensor detects the collision of the vehicle. That is, since the partition is inflated in the space between the pair of the vehicle seats without interfering with the vehicle seats, the partition can reliably restrain an occupant who receives a collision load and is thereby displaced in the vehicle longitudinal direction from the vehicle seat. In this way, it is possible to easily secure a private space in the cabin and to improve occupant restraint performance.

16 Claims, 20 Drawing Sheets

(51) Int. Cl.
*B60R 21/0134* (2006.01)
*B60R 21/214* (2011.01)
*B60R 21/237* (2006.01)
*B60R 21/26* (2011.01)
*B60R 21/233* (2006.01)
*B60R 21/262* (2011.01)
*B60R 21/231* (2011.01)
*B60R 21/261* (2011.01)
*B60R 21/00* (2006.01)

(52) U.S. Cl.
CPC .......... *B60R 21/214* (2013.01); *B60R 21/233* (2013.01); *B60R 21/237* (2013.01); *B60R 21/26* (2013.01); *B60R 21/262* (2013.01); *B60R 2021/0004* (2013.01); *B60R 2021/0011* (2013.01); *B60R 2021/23161* (2013.01); *B60R 2021/23308* (2013.01); *B60R 2021/2612* (2013.01)

(58) Field of Classification Search
CPC ... B60R 21/214; B60R 21/232; B60R 21/233; B60R 21/237; B60R 21/26; B60R 21/261; B60R 21/262; B60R 2021/0004; B60R 2021/0011; B60R 2021/0253; B60R 2021/0266; B60R 2021/0273; B60R 2021/0293; B60R 2021/23161; B60R 2021/23308; B60R 2021/2612; B60R 2021/2617
See application file for complete search history.

(56) References Cited

U.S. PATENT DOCUMENTS

| | | | | |
|---|---|---|---|---|
| 7,516,978 B2* | 4/2009 | Quach | ................... | B60R 21/213 280/730.2 |
| 7,625,005 B2* | 12/2009 | Saberan | ................ | B60R 21/213 280/730.2 |
| 9,725,064 B1* | 8/2017 | Faruque | ................ | B60N 2/143 |
| 9,771,043 B2* | 9/2017 | Soules | .................. | B60R 21/214 |
| 9,789,840 B2* | 10/2017 | Farooq | ................. | B60R 21/214 |
| 9,994,182 B1* | 6/2018 | Jaradi | ................. | B60R 21/232 |
| 10,023,145 B1* | 7/2018 | Rivera | ................. | B60R 21/0136 |
| 10,023,146 B2* | 7/2018 | Faruque | ................. | B60R 21/233 |
| 10,065,592 B2* | 9/2018 | Jaradi | ....................... | B60N 2/14 |
| 10,279,770 B2* | 5/2019 | Faruque | ................ | B60R 21/2342 |
| 10,343,642 B2* | 7/2019 | Faruque | ............ | B60R 21/23184 |
| 10,407,018 B2* | 9/2019 | Sundararajan | ...... | B60R 21/2338 |
| 10,471,923 B2* | 11/2019 | Jimenez | .............. | B60R 21/2338 |
| 10,486,637 B2* | 11/2019 | Thomas | ............... | B60R 21/215 |
| 10,589,708 B2* | 3/2020 | Cho | .................... | B60R 21/2338 |
| 10,625,701 B2* | 4/2020 | Cho | ..................... | B60R 21/214 |
| 10,661,748 B1* | 5/2020 | Zoellner | .............. | B60R 21/164 |
| 10,688,954 B2* | 6/2020 | Thomas | ............... | B60R 21/215 |
| 10,688,955 B2* | 6/2020 | Shin | .................. | B60R 21/01512 |
| 10,703,320 B2* | 7/2020 | Farooq | .................. | B60R 21/214 |
| 10,717,358 B2* | 7/2020 | Patil | ...................... | B60K 35/00 |
| 10,953,835 B2* | 3/2021 | Gould | ................... | B60R 21/214 |
| 10,960,839 B2* | 3/2021 | Imura | .................... | B60N 2/14 |
| 10,974,685 B2* | 4/2021 | Kwon | .................. | B60R 21/26 |
| 10,981,531 B2* | 4/2021 | Jaradi | ................... | B60R 21/233 |
| 11,040,687 B2* | 6/2021 | Jayakar | ................. | B60R 21/214 |
| 2018/0312082 A1* | 11/2018 | Lalague | ................ | B60N 2/91 |
| 2019/0202377 A1* | 7/2019 | Mizutani | .............. | B62D 31/025 |
| 2020/0108698 A1* | 4/2020 | Sakurai | .................... | B60R 21/214 |
| 2020/0139923 A1* | 5/2020 | Ostling | ................. | B60R 21/231 |
| 2020/0361410 A1* | 11/2020 | Jayakar | ................. | B60R 21/01554 |
| 2020/0377041 A1* | 12/2020 | Sekizuka | ................ | B60R 21/06 |
| 2020/0384939 A1* | 12/2020 | Rutgersson | ........... | B60R 21/214 |
| 2020/0391688 A1* | 12/2020 | Schroeder | ............. | B60R 21/233 |
| 2020/0391689 A1* | 12/2020 | Fischer | ................. | B60R 21/214 |
| 2020/0406852 A1* | 12/2020 | Fischer | ................. | B60R 21/26 |
| 2020/0406853 A1* | 12/2020 | Fischer | ................. | B60R 21/233 |
| 2021/0009072 A1* | 1/2021 | Hwangbo | ............. | B60R 21/214 |
| 2021/0046890 A1* | 2/2021 | Jayakar | ................. | B60R 21/232 |
| 2021/0101559 A1* | 4/2021 | Fischer | ................. | B60R 21/232 |
| 2021/0114546 A1* | 4/2021 | Jayakar | ................. | B60R 21/2338 |
| 2021/0114547 A1* | 4/2021 | Fischer | ................. | B60R 21/239 |

FOREIGN PATENT DOCUMENTS

| | | | |
|---|---|---|---|
| JP | 2000255355 A | * | 9/2000 |
| JP | 2017-149331 A | | 8/2017 |
| JP | 2017-149351 A | | 8/2017 |
| JP | 2018203227 A | * | 12/2018 |
| WO | 2018167919 A1 | | 9/2018 |

* cited by examiner

OCCUPANT PROTECTIVE APPARATUS INCLUDING AN INFLATABLE PARTITION

CROSS-REFERENCE TO RELATED APPLICATIONS

This application claims priority to Japanese Patent Application No. 2019-104731 filed on Jun. 4, 2019, which is incorporated herein by reference in its entirety including the specification, drawings and abstract.

BACKGROUND

1. Technical Field

The present disclosure relates to an occupant protective apparatus.

2. Description of Related Art

An occupant protective apparatus is disclosed in International Patent Application Publication No. 2018/167919. This occupant protective apparatus includes: a pair of vehicle seats that can oppose in a vehicle longitudinal direction; and an airbag system provided in a portion in a ceiling of a cabin, the portion corresponding to a position between the pair of the vehicle seats. The airbag system inflates and deploys an airbag in the case where a direction of a collision during a collision of the cabin matches one direction in the vehicle longitudinal direction. As a result, occupants who are seated on the pair of the vehicle seats arranged to oppose each other can be restrained by the airbag during a collision of the vehicle.

SUMMARY

By the way, in recent years, various types of carpooling services in which strangers travel in the same vehicle, such as ride-sharing, have been examined. However, like the configuration disclosed in International Patent Application Publication No. 2018/167919, in the case where the occupants who are the strangers are seated on the pair of the vehicle seats opposing in the vehicle longitudinal direction, it is difficult to secure privacy of the occupants. On the contrary, in the case where the vehicle seats are arranged in the same direction, such as a front direction of the vehicle, the privacy of the occupants can be secured to a certain extent. Meanwhile, in the case where the vehicle seats in the vehicle longitudinal direction are arranged in the same direction, such vehicle seats can be brought into a comfortable state where a seat back of the front vehicle seat is reclined significantly or a relaxing state where the front vehicle seat is slid significantly to a vehicle rear side. As a result, the airbag, which is provided between the vehicle seat in the comfortable state or the relaxing state and the other vehicle seat, may be interfered when being inflated and deployed. Thus, there is a possibility that the airbag cannot restrain the occupants effectively during the collision of the vehicle. For such a reason, the related art described above has room for improvement in terms of these points.

The present disclosure has been made in consideration of the above facts, and therefore has a purpose of obtaining an occupant protective apparatus capable of easily securing a private space in a cabin and improving occupant restraint performance.

One aspect of an occupant protective apparatus according to the present disclosure includes: a collision detection sensor that detects a collision of a vehicle; an inflator that is actuated to supply gas when the collision detection sensor detects the collision of the vehicle; and a partition that is provided in a cabin and provided between a pair of vehicle seats arranged to oppose each other in a vehicle longitudinal direction, that is selectively brought into a shielding state, in which the partition extends from an upper portion to a lower portion of the cabin in such a manner as to partition a space between the pair of the vehicle seats, and a non-shielding state, in which the partition is stored in a specified position, and that is supplied with the gas from the inflator and inflated to be thickened in the vehicle longitudinal direction when being in the shielding state during the collision of the vehicle.

According to the aspect above, the occupant protective apparatus includes the collision detection sensor, the inflator, and the partition. Of these, the partition is provided between the pair of the opposing vehicle seats in the vehicle longitudinal direction in the cabin, and can selectively be brought into the shielding state or the non-shielding state. That is, even in the case where the partition is brought into the shielding state when the pair of the opposing vehicle seats each adopt a comfortable state where a seat back is reclined significantly or a relaxing state where the vehicle seat is slid to a secure sufficient legroom, the partition is less likely to interfere with the vehicle seats. For such a reason, the partition in the shielding state extends from the upper portion to the lower portion of the cabin in the manner to partition the space between the pair of the opposing vehicle seats. Thus, with the partition in the shielding state, lines of sight of occupants who are seated on the vehicle seats can be blocked. In addition, the partition in the non-shielding state is stored in a specified position. Thus, in the case where the occupant is seated on one of the vehicle seats, or the like, the partition is brought into the non-shielding state, which can provide a sense of openness.

Meanwhile, in the case where the partition is in the shielding state during the collision of the vehicle, the partition is supplied with the gas from the inflator, which is actuated when the collision detection sensor detects the collision of the vehicle, and is thereby inflated to be thickened in the vehicle longitudinal direction. That is, since the partition is inflated in the space between the pair of the vehicle seats without interfering with the vehicle seats, the partition can further reliably restrain the occupant who receives a collision load and is thereby displaced in the vehicle longitudinal direction from the vehicle seat.

In the occupant protective apparatus according to the present disclosure, the partition in the non-shielding state may be stored in a state of being rolled around a partition rolling core that is provided on a ceiling of the cabin and formed in a cylindrical shape, the partition rolling core may be formed with a plurality of injection holes, and the gas from the inflator may be supplied into the partition via the injection holes.

According to the above aspect, the partition in the non-shielding state is stored in the rolled state around the partition rolling core. This partition rolling core is provided on the ceiling of the cabin, is formed in the cylindrical shape, and is formed with the plurality of the injection holes. The gas supplied from the inflator is supplied into the partition via each of these injection holes. Thus, the gas can be supplied into the partition with the simple configuration.

In the occupant protective apparatus according to the present disclosure, the vehicle may be provided with a collision prediction sensor that predicts the collision of the vehicle, and in the case where the partition is in the non-shielding state when the collision prediction sensor predicts the collision of the vehicle, the partition may be brought into the shielding state more promptly than in a normal time.

According to the aspect above, in the case where the partition is in the non-shielding state when the collision prediction sensor, which predicts the collision of the vehicle, predicts the collision of the vehicle, the partition is brought into the shielding state more promptly than in the normal time. Thus, it is possible to further reliably restrain the occupant during the collision of the vehicle. That is, even in the case where the partition does not extend from the upper portion to the lower portion of the cabin, the partition is promptly brought into the shielding state, in which the partition extends from the upper portion to the lower portion of the cabin, at a stage at which the collision is predicted. Accordingly, the partition can be inflated promptly during the collision of the vehicle. Thus, it is possible to further reliably restrain the occupant who receives the collision load and is displaced in the vehicle longitudinal direction from the vehicle seat.

In the occupant protective apparatus according to the present disclosure, the partition may be set such that a vehicle longitudinal dimension of a partition upper portion, which constitutes a portion on a vehicle upper side of a substantially center portion in a vehicle vertical direction in the shielding state, is larger than that of a partition lower portion, which constitutes a portion on a vehicle lower side of the substantially center portion in the vehicle vertical direction in the shielding state.

According to the aspect above, the partition includes the partition upper portion that constitutes the portion on the vehicle upper side of the substantially center portion in the vehicle vertical direction in the shielding state. In general, when the occupant who is seated on the vehicle seat is displaced to the partition side during the collision of the vehicle, a head of the occupant is likely to abut the partition upper portion. In particular, in a vehicle in which a longitudinal length of the cabin is short, a vehicle in which the partition is arranged closer to one of the vehicle seats than the other, a vehicle in which a ceiling height of the cabin is low, or the like, the head of the occupant is further likely to abut the partition upper portion of the partition during the collision of the vehicle. Since the vehicle longitudinal dimension of this partition upper portion during the inflation is set to be larger than that of the partition lower portion, which constitutes the portion on the vehicle lower side of the substantially center portion in the vehicle vertical direction in the shielding state, a sufficient shock absorbing stroke can be secured. Thus, it is possible to further effectively absorb the collision load applied to the head of the occupant.

In the occupant protective apparatus according to the present disclosure, the partition upper portion may be provided with an additional bag that has a separate structure and is inflated to be thickened in the vehicle longitudinal direction when being supplied with the gas from the inflator.

According to the aspect above, the additional bag is provided in the partition upper portion of the partition, and the additional bag has the separate structure that is inflated to be thickened in the vehicle longitudinal direction when being supplied with the gas from the inflator. Accordingly, it is possible to easily make adjustment such as an increase in the vehicle longitudinal dimension of the partition upper portion during the inflation. As a result, the sufficient shock absorbing stroke can be secured according to the vehicle, and thus it is possible to further effectively absorb the collision load applied to the head of the occupant.

In the occupant protective apparatus according to the present disclosure, the partition upper portion and the partition lower portion may be provided with a plurality of uninflated sections, each of which extends in the vehicle vertical direction and is not supplied with the gas from the inflator during inflation, and the number of the uninflated sections provided in the partition upper portion may be set to be smaller than the number of the uninflated sections provided in the partition lower portion.

According to the aspect above, the partition is provided with the plurality of the uninflated sections. Since the gas from the inflator is not supplied into each of these uninflated sections, the vehicle longitudinal dimension of the partition during the inflation becomes smaller than that of the portion other than the uninflated sections, that is, an inflated section. That is, as the number of the uninflated sections is increased, a thickness dimension in the vehicle longitudinal direction of the partition during the inflation is reduced. As the number of the uninflated sections is reduced, the thickness dimension in the vehicle longitudinal direction of the partition during the inflation is increased. In addition, the uninflated sections are provided in the partition upper portion and the partition lower portion of the partition, and the number of the uninflated sections provided in the partition upper portion is set to be smaller than the number of the uninflated sections provided in the partition lower portion. Accordingly, with the simple configuration, the thickness dimension in the vehicle longitudinal direction of the partition upper portion during the inflation of the partition can be increased to be larger than that of the partition lower portion.

In the occupant protective apparatus according to the present disclosure, each of the partition upper portion and the partition lower portion may be provided with a plurality of uninflated sections, each of which extends in the vehicle vertical direction and is not supplied with the gas from the inflator during inflation, and the uninflated sections provided in the partition upper portion and the partition lower portion may be arranged in line in the vehicle vertical direction during the inflation.

According to the aspect above, the plurality of the uninflated sections is provided in each of the partition upper portion and the partition lower portion. The uninflated sections are arranged in line in the vehicle vertical direction during the inflation. Accordingly, portions other than the uninflated sections in the partition upper portion and the partition lower portion, that is, the inflated sections continue in the vehicle vertical direction, and the inflated sections act as columns during the inflation. Thus, the partition is less likely to be bent in the vehicle longitudinal direction. As a result, it is possible to stably maintain an infrared, deployed shape.

In the occupant protective apparatus according to the present disclosure, a communicating section that extends in the vehicle width direction and is inflated when being supplied with the gas from the inflator may be provided on each side of the uninflated sections in the vehicle vertical direction during the inflation of the partition.

According to the aspect above, the communicating section is provided on each of the sides of the uninflated sections in the vehicle vertical direction. Each of these communicating sections extends in the vehicle width direction, and is inflated when being supplied with the gas from the inflator. Accordingly, each of the communicating sections is continuously provided in the vehicle width direction during the inflation of the partition, and each of the communicating sections acts like a beam. Thus, the partition is less likely to be bent in the vehicle width direction. As a result, it is possible to stably maintain the infrared, deployed shape.

In the occupant protective apparatus according to the present disclosure, an exterior skin may be locked to a surface of the partition via a locking section, and the locking section may cancel a locked state between the exterior skin and the partition during the inflation of the partition.

According to the aspect above, the exterior skin is locked to the surface of the partition by the locking section. Accordingly, it is possible to improve appearance of the partition in the normal time. Meanwhile, the locking section cancels the locked state between the exterior skin and the partition during the inflation of the partition. Thus, it is possible to suppress the inflation of the partition from being hindered by the exterior skin during the collision of the vehicle.

In the occupant protective apparatus according to the present disclosure, a vehicle lower end of the partition in the shielding state may be held by a floor of the cabin.

According to the aspect above, since the vehicle lower end of the partition in the shielding state is held by the floor of the cabin, the partition in the shielding state can be suppressed from flopping due to input of a load from a leg of the occupant, inertia during travel of the vehicle, or the like.

In the occupant protective apparatus according to the present disclosure, the partition may be able to be stored in a case that extends in a seat width direction, and the case may be attached to a vehicle body framework at plural positions in a longitudinal direction of the case.

According to the aspect above, the partition can be stored in the case. This case extends in the seat width direction, and is attached to the vehicle body framework at the plural positions in the longitudinal direction of the case. That is, the vehicle body frameworks can be coupled to each other by the case.

The occupant protective apparatus according to the present disclosure has such a superior effect that it is possible to easily secure a private space in the cabin and to improve occupant restraint performance.

The occupant protective apparatus according to the present disclosure has such a superior effect that it is possible to set production cost to be low.

The occupant protective apparatus according to the present disclosure has such a superior effect that it is possible to further improve the occupant restraint performance.

The occupant protective apparatus according to the present disclosure has such a superior effect that it is possible to appropriately restrain the occupant.

The occupant protective apparatus according to the present disclosure has such a superior effect that it is possible to appropriately restrain the occupant with the simple configuration.

The occupant protective apparatus according to the present disclosure has such a superior effect that it is possible to further improve the occupant restraint performance.

The occupant protective apparatus according to the present disclosure has such a superior effect that it is simultaneously improve exterior design and the occupant restraint performance.

The occupant protective apparatus according to the present disclosure has such a superior effect that it is possible to improve noise and vibration (hereinafter simply referred to as "NV") performance.

The occupant protective apparatus according to the present disclosure has such a superior effect that it is possible to improve flexural rigidity of the vehicle body framework.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS (First Embodiment) A description will hereinafter be made on a first embodiment of an occupant protective apparatus 10 according to the present disclosure with reference to FIG. 1 to FIG. 11.

Figure 1:
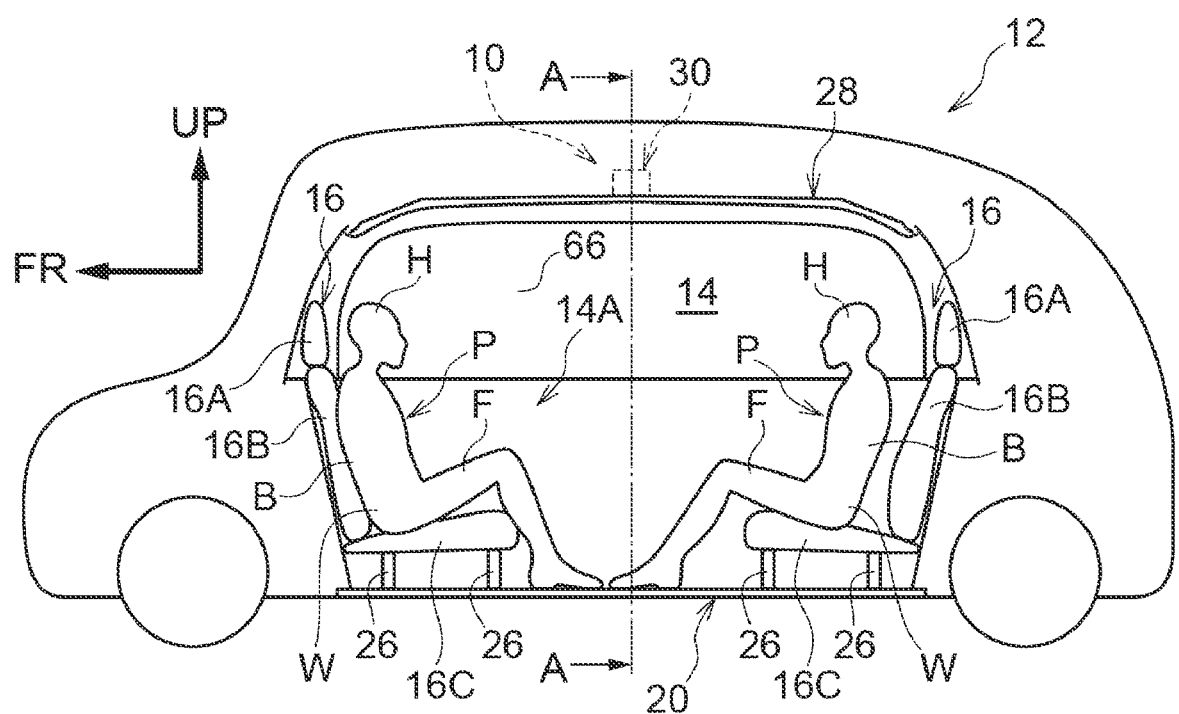
FIG. 1 is a side view schematically illustrating interior of a cabin in a vehicle equipped with an occupant protective apparatus according to a first embodiment.

(Overall Configuration) As illustrated in FIG. 1, a vehicle 12 equipped with the occupant protective apparatus 10 is an automated driving vehicle, as an example. A driver's seat is not provided in a cabin 14, and a pair of vehicle seats 16 that are arranged to oppose each other in a vehicle longitudinal direction is provided adjacently on each side in a vehicle width direction (see FIG. 2). Each of these vehicle seats 16 is configured to include: a headrest 16A that supports a head H of a seated occupant P; a seat back 16B that supports a back B of the occupant P; and a seat cushion 16C that supports a lower back W (including buttocks herein) and thighs F of the occupant P.

Figure 2:
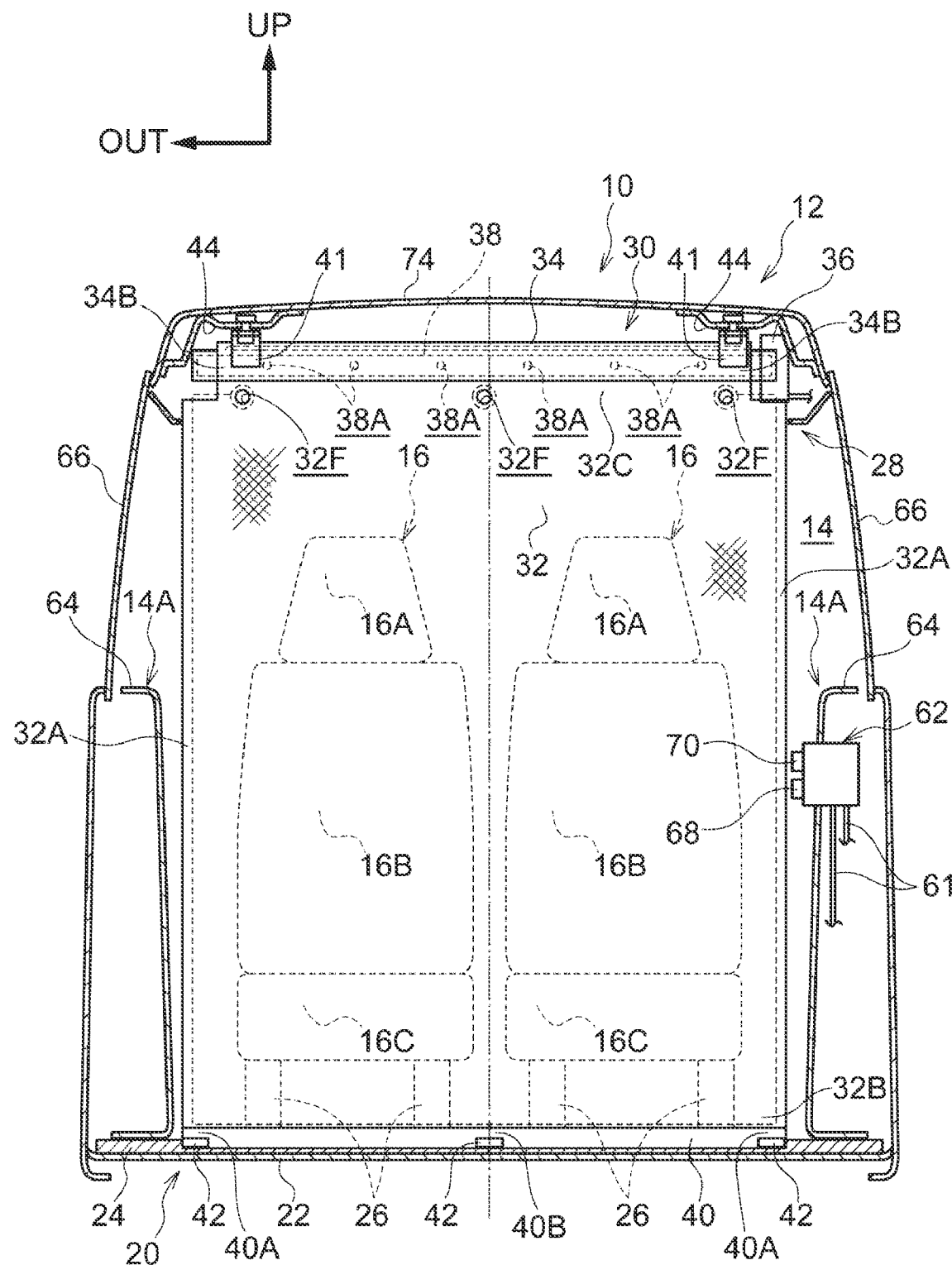
FIG. 2 is an enlarged cross-sectional view schematically illustrating a state taken along line A-A in FIG. 1 and a shielding state of the occupant protective apparatus according to the first embodiment.

As illustrated in FIG. 2, a floor 20 of the vehicle 12 is configured to include: a floor panel 22 made of steel; and a floor carpet 24 that has a fiber layer on the cabin 14 side. The floor carpet 24 is placed on the floor panel 22 and is formed with unillustrated cuts at positions corresponding to attachment legs 26 for the vehicle seat 16. In this way, the attachment legs 26 of the vehicle seat 16 are directly attached to the floor panel 22.

(Partition Unit) A partition unit 30 is provided on a ceiling 28 in the cabin 14. This partition unit 30 includes a partition 32, a partition storage case 34 as a case, a partition drive mechanism 36, and a partition rolling core 38 (see FIG. 3 and FIG. 4). The partition 32 is provided with a pair of cloth members (base fabrics), each of which has the vehicle longitudinal direction as a thickness direction, has the vehicle vertical direction as a longitudinal direction, and is formed in a rectangular shape. Outer circumferential ends of the cloth members are sewn to each other. In this way, the partition 32 is formed in a bag shape. That is, the partition 32 is not transparent and has flexibility. When an inflator 72, which will be described later, supplies gas into the partition 32, the partition 32 is inflated so as to have the thickness in the vehicle longitudinal direction. An outer end 32A of this partition 32 in the vehicle width direction is arranged to oppose a side wall 14A of the cabin 14 when seen from the front. A dimension of the partition 32 in the vehicle vertical direction is set to be larger than a dimension from the ceiling 28 to the floor 20 in the cabin 14.

A partition lower end bar 40 is provided in a lower end portion 32B of the partition 32. This partition lower end bar 40 is formed of a prismatic member and has a longitudinal direction in the vehicle width direction. A lower end core 40C that is provided in the interior of the partition lower end bar 40 is inserted in the interior of the lower end portion 32B of the partition 32. In this way, the partition 32 and the partition lower end bar 40 are locked (see FIG. 3). In addition, the partition lower end bar 40 is provided with a plurality of locks 42 that are separated in the longitudinal direction, more specifically, in a vehicle lower portion at each longitudinal end 40A and a vehicle lower portion in longitudinal middle 40B of the partition lower end bar 40. This lock 42 is formed of a member having magnetism as an example. When the partition lower end bar 40 abuts the floor carpet 24, the partition lower end bar 40 is locked to the floor panel 22 with a magnetic force via the floor carpet 24.

Figure 3:
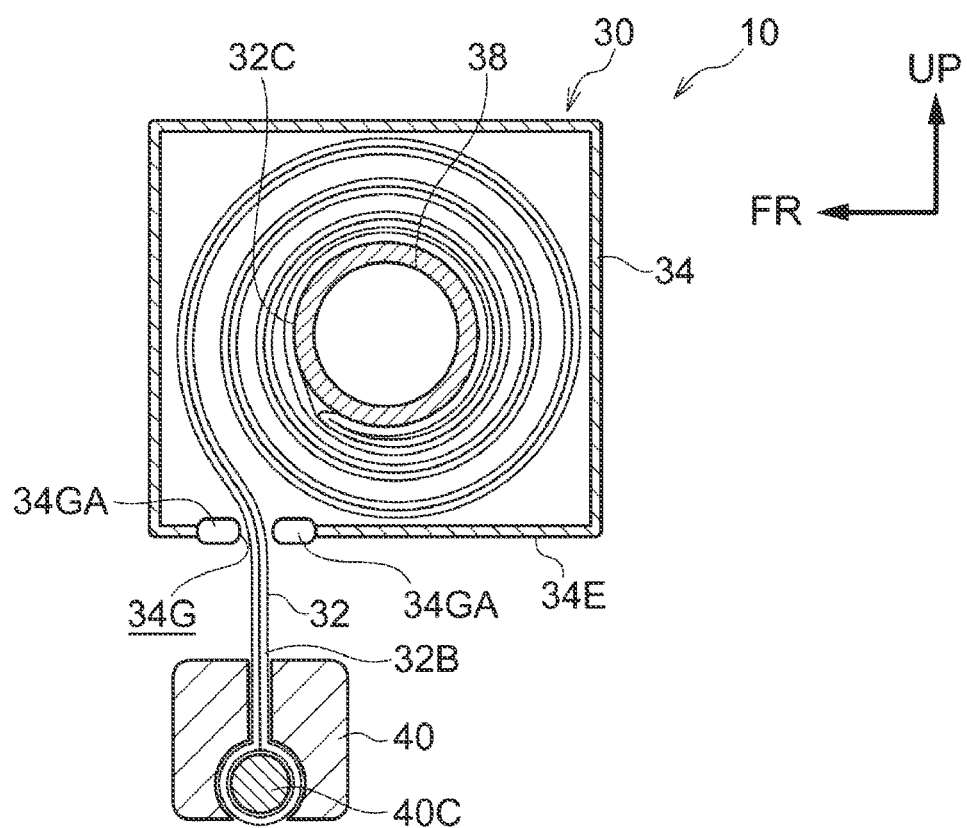
FIG. 3 is an enlarged cross-sectional view illustrating a state where the occupant protective apparatus according to the first embodiment in a non-shielding state is cut along a cross section that is orthogonal to a vehicle width direction.

As illustrated in FIG. 3, the partition rolling core 38 is provided in the interior of an upper end portion 32C of the partition 32 that is formed in the bag shape. In addition, a plurality of through holes 32F (see FIG. 2) is formed in the upper end portion 32C of the partition 32. A clamp member, which is not illustrated, is inserted through the through hole 32F, so as to fasten the partition 32 and the partition rolling core 38. In this way, the upper end portion 32C of the partition 32 is locked to the partition rolling core 38. This partition rolling core 38 is stored in the partition storage case 34 and formed in a cylindrical shape having an axial direction in the vehicle width direction. A plurality of injection holes 38A, each of which communicates with the interior of the partition rolling core 38, is provided in an outer circumferential wall (see FIG. 4).

Figure 5:
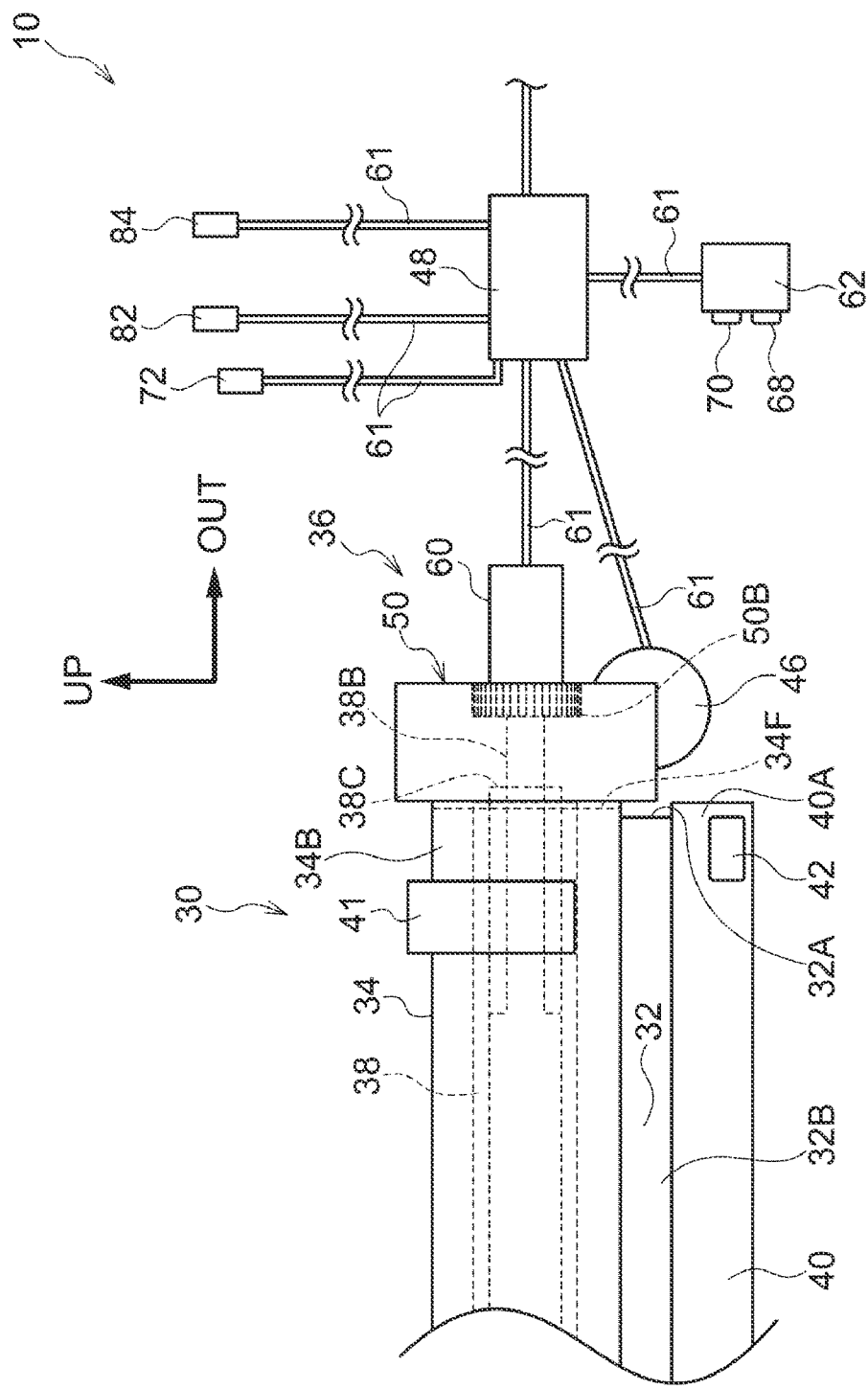
FIG. 5 is a front view schematically illustrating an actuation mechanism for the occupant protective apparatus according to the first embodiment.

As illustrated in FIG. 5, at each longitudinal end of the partition rolling core 38, a rotating shaft 38B that is formed in a cylindrical shape and has the same axial direction as the partition rolling core 38 is provided. More specifically, the rotating shaft 38B is projected outward in the vehicle width direction from an unillustrated through hole that is formed in a rolling core side wall 38C provided at each of the longitudinal ends of the partition rolling core 38. In this way, the interior and the exterior of the partition rolling core 38 can communicate with each other via the interior of the rotating shaft 38B. This rotating shaft 38B is set to have a smaller diameter dimension than the partition rolling core 38, and is also set to be projected outward from the partition storage case 34 in the vehicle width direction.

The partition storage case 34 is formed of a square tube member (see FIG. 3) that has a longitudinal direction in the vehicle width direction and is made of steel. Longitudinal ends 34B of the partition storage case 34 are fastened to a right and left pair of roof side rails 44, which constitute a part of a vehicle body framework of the vehicle 12, via brackets 41 (see FIG. 2).

The end 34B of the partition storage case 34 is provided with an end wall 34F that has a plate thickness direction in the vehicle width direction. The end 34B of the partition storage case 34 is thereby closed. This end wall 34F is formed with a through hole that penetrates in the plate thickness direction and is not illustrated. The rotating shaft 38B of the partition rolling core 38, which is stored in the partition storage case 34, is inserted in the through hole, so as to be projected outward from the partition storage case 34. In this way, the partition rolling core 38 is rotatably supported by the partition storage case 34 with the vehicle width direction as the axial direction of the partition rolling core 38.

As illustrated in FIG. 3, a partition wall communication hole 34G is formed in a vehicle lower wall 34E of the partition storage case 34. In a portion of the vehicle lower wall 34E on one side in the vehicle longitudinal direction (in this embodiment, a vehicle front side as an example), this partition wall communication hole 34G is formed by penetrating the portion in the vehicle vertical direction and is provided with a frame member 34GA at an opening edge thereof. The partition 32 is inserted through this partition wall communication hole 34G.

Figure 6:
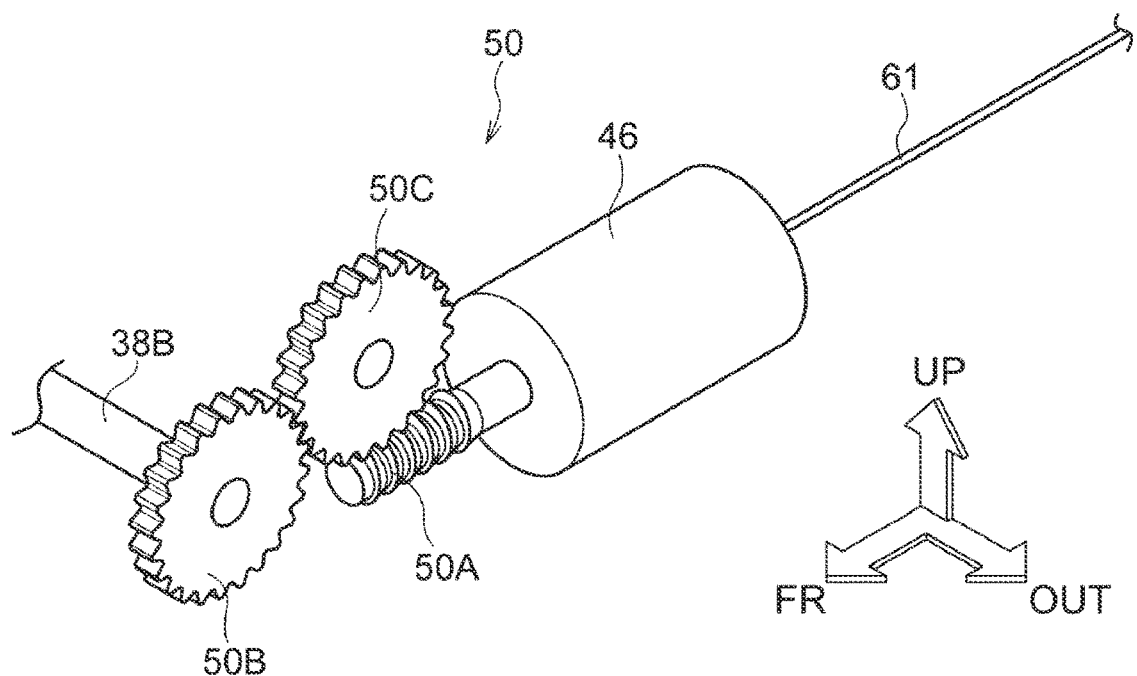
FIG. 6 is a perspective view schematically illustrating main sections of the actuation mechanism for the occupant protective apparatus according to the first embodiment.

(Drive Mechanism) As illustrated in FIG. 5, the partition drive mechanism 36 is provided at the end 34B on one side in the vehicle width direction of the partition storage case 34. The partition drive mechanism 36 includes a motor 46, a control ECU 48, a gear mechanism 50, and a potentiometer 60. As illustrated in FIG. 6, the motor 46 can rotate with the vehicle longitudinal direction as an axial direction, and is connected to the control ECU 48 by a harness 61 (see FIG. 5).

The gear mechanism 50 is configured to include a plurality of gears 50A, 50B, 50C. The gear 50A is a so-called worm gear that is provided on a rotation shaft of the motor 46. The gear 50B is a so-called spur gear that is joined to the rotating shaft 38B on the one side in the vehicle width direction of the partition rolling core 38 (see FIG. 5). The gear 50C is a so-called spur gear that is rotatably provided between the gear 50A and the gear 50B, and transmits rotation of the gear 50A to the gear 50B. In this way, rotation of the motor 46 can be transmitted to the rotating shaft 38B and further to the partition rolling core 38, so as to allow the partition rolling core 38 to rotate.

As illustrated in FIG. 5, the potentiometer 60 is provided on an outer side of the gear 50B in the vehicle width direction and can detect an angle θ with respect to a specified reference position with an axis of the gear 50B and further an axis of the partition rolling core 38 being a center. The potentiometer 60 is connected to the control ECU 48 by the harness 61.

The control ECU 48 is configured to include a central processing unit (CPU), memory such as read only memory (ROM) and random access memory (RAM), non-volatile storage section such as a hard disk drive (HDD) or solid state drive (SSD), and a communication interface (I/F) (none of them is illustrated). These CPU, memory, storage section, and communication I/F connected to each other in a mutually communicable manner via an unillustrated bus. The storage section stores a partition actuation program and a partition inflation program. When the CPU executes the partition actuation program by an operation of an operation switch 62, which will be described later, the partition 32 can selectively be switched between a shielding state and a non-shielding state. In addition, when a collision detection sensor 82, which will be described later, detects a collision of the vehicle or when a collision prediction sensor 84 predicts the collision of the vehicle, the CPU executes the partition inflation program, so as to be able to inflate the partition 32 or bring the partition 32 into the shielding state.

(Operation Switch) As illustrated in FIG. 2, the operation switch 62 is provided in one of a right and left pair of center pillar garnishes 64 that constitute a part of the side wall 14A of the cabin 14. The operation switch 62 is provided at a height at which the occupant P (see FIG. 1) who is seated on the vehicle seat 16 can visually recognize and operate the operation switch 62. More specifically, the operation switch 62 is provided at a position, which is adjacent to a side windshield 66, in the center pillar garnish 64 in such a manner as to be exposed to the cabin 14 side. The operation switch 62 is provided between the pair of the vehicle seats 16 in the vehicle longitudinal direction.

The operation switch 62 includes a partition drawing switch 68 and a partition rolling switch 70. Each of the partition drawing switch 68 and the partition rolling switch 70 is connected to the control ECU 48 via the harness 61 (see FIG. 5). As an example, each of the partition drawing switch 68 and the partition rolling switch 70 is a push-button switch that is turned ON (energized) while being pushed by the occupant P. In addition, each of the partition drawing switch 68 and the partition rolling switch 70 is provided with a symbol that is not illustrated and indicates a moving direction of the partition 32 when being turned ON. In this way, the occupant P can operate the partition drawing switch 68 and the partition rolling switch 70 intuitively.

Figure 7:
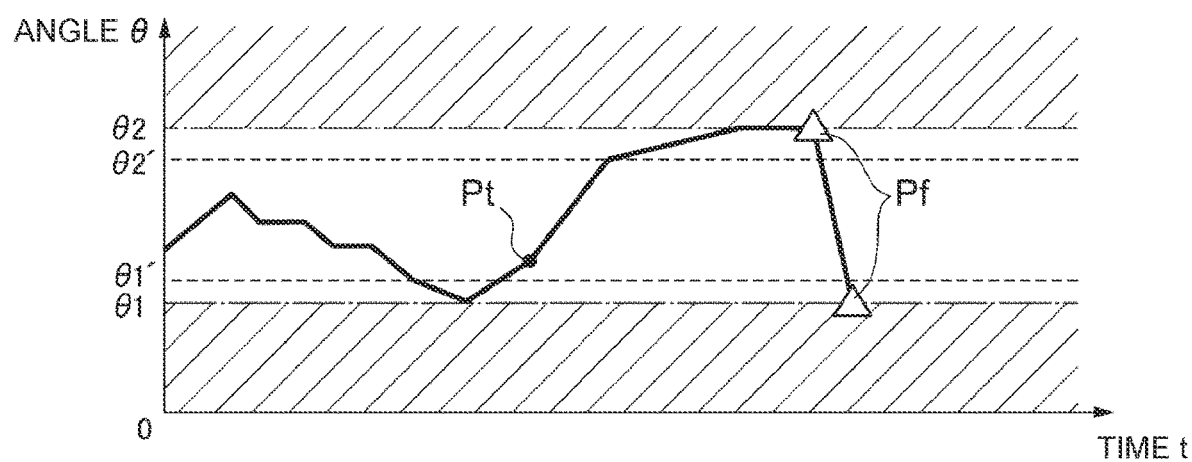
FIG. 7 is a graph illustrating an example of an actuation state of the actuation mechanism for the occupant protective apparatus according to the first embodiment.

As illustrated in FIG. 5, the control ECU 48 causes the motor 46 to rotate by pulse width modulation (PWM) control on the basis of the angle θ of the partition rolling core 38, which is acquired from the potentiometer 60, and the operation of the operation switch 62. More specifically, as illustrated in FIG. 7, in the case where the partition rolling switch 70 is turned ON and the angle θ of the partition rolling core 38 is smaller than a rolling reference angle θ2, the control ECU 48 causes the motor 46 to rotate positively, so as to increase the angle θ. In this case, the partition 32 is wound around the partition rolling core 38 (see FIG. 3). Consequently, the partition 32 is brought into the non-shielding state where the partition 32 does not extend from the upper side to the lower side of the cabin 14. As long as at least the partition drawing switch 68 (see FIG. 2) is not turned ON while the motor 46 rotates positively, the control ECU 48 causes the motor 46 to rotate until the angle θ of the partition rolling core 38 reaches the rolling reference angle θ2.

Meanwhile, in the case where the partition drawing switch 68 is turned ON and the angle θ of the partition rolling core 38 exceeds a drawing reference angle θ1, the control ECU 48 causes the motor 46 to rotate reversely, so as to reduce the angle θ. In this case, rolling of the partition 32 around the partition rolling core 38 is stopped. Thereafter, with a gravitational force, the partition 32 is brought into the shielding state where the partition 32 extends from the upper side to the lower side of the cabin 14. As long as at least the partition rolling switch 70 is not turned ON while the motor 46 rotates reversely, the control ECU 48 causes the motor 46 to rotate until the angle θ of the partition rolling core 38 reaches the drawing reference angle θ1. That is, the control ECU 48 causes the motor 46 to rotate within a range of the angle θ of the partition rolling core 38 between the drawing reference angle θ1 and the rolling reference angle θ2 (see a bold line in FIG. 7). The drawing reference angle θ1 is set as an angle that has a specified margin (see a hatched area in FIG. 7) with respect to a reference angle (as an example, an angle at which a longitudinal dimension of a portion of the partition 32 extending to the interior of the cabin 14 becomes the maximum). It is set that, also at the drawing reference angle θ1, the partition lower end bar 40 abuts the floor carpet 24 (see FIG. 2). The rolling reference angle θ2 is set as an angle that has a specified margin (see the hatched area in FIG. 7) with respect to a rolling limit angle of the partition 32 (an angle at which the partition lower end bar 40 of the partition 32 abuts the vehicle lower wall 34E of the partition storage case 34 so that the partition 32 cannot be rolled any more).

A rotation speed of the motor 46 within a range between the drawing reference angle θ1 and a deceleration threshold angle θ1' and a range between the rolling reference angle θ2 and a deceleration threshold angle θ2' is set to be lower than the rotation speed of the motor 46 within a range between the deceleration threshold angle θ1' and the deceleration threshold angle θ2'. That is, when the partition 32 is brought into the non-shielding state from the shielding state, it is possible to slow operation to start moving and stop the partition 32. Furthermore, even when the partition drawing switch 68 is turned ON and the partition 32 is thereby brought into the shielding state from the non-shielding state, similar to the above, it is possible to slow the operation to start moving and stop the partition 32. In this way, in regard to the actuation of the partition 32, a touch of class can be produced.

Moreover, the control ECU 48 changes the rotation speed of the motor 46 on the basis of an operation period of the operation switch 62. That is, in the case where the partition rolling switch 70 or the partition drawing switch 68 in the operation switch 62 is kept ON for a longer period than a specified period, it is determined that "the occupant P is desired to move the partition 32 significantly", and the rotation speed of the motor 46 is increased within the range between the deceleration threshold angle θ1' and the deceleration threshold angle θ2' (see a point Pt in FIG. 7). In this way, the partition 32 can be actuated according to an intention of the occupant P who operates the partition 32, which further improves convenience.

Figure 4:
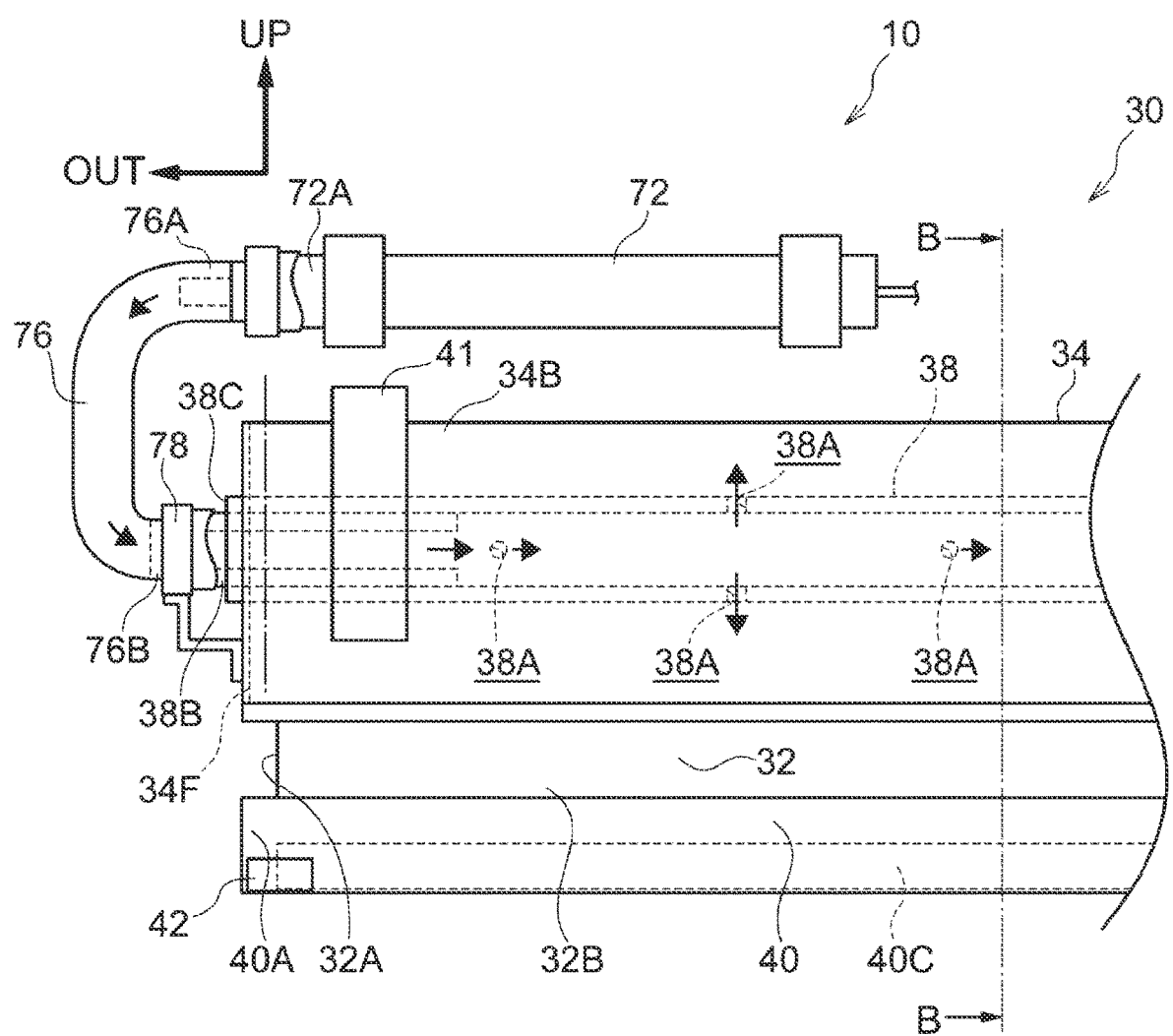
FIG. 4 is a front view of the non-shielding state of the occupant protective apparatus according to the first embodiment.

(Inflator) As illustrated in FIG. 4, on the vehicle upper side and one side in the vehicle width direction of the partition unit 30, the inflator 72 in a substantially columnar shape is provided to generate gas as the gas during the collision of the vehicle. As an example, the inflator 72 is formed in a thin and long columnar shape and is arranged between the partition storage case 34 and a roof panel 74 (see FIG. 2, note that the inflator 72 is not illustrated in FIG. 2) with the vehicle width direction as an axial direction thereof. A gas injection hole, which is not illustrated, is formed at an outer end 72A in the vehicle width direction of the inflator 72, and a coupling pipe 76 is coupled to the outer end 72A in the vehicle width direction so as to seal the gas injection hole. This coupling pipe 76 is constructed of a cylindrical member that is formed in a substantially U-shape and is opened inward in the vehicle width direction when seen from the front of the vehicle. A longitudinal end 76A, which is located on the vehicle upper side, in the coupling pipe 76 is coupled to the inflator 72 as described above. Another longitudinal end 76B, which is located on the vehicle lower side, in the coupling pipe 76 is coupled to a pipe joint 78 in an airtight state. The pipe joint 78 is joined to the rotating shaft 38B on the one side in the longitudinal direction of the partition rolling core 38 in such a manner as to make relative rotation thereto. In this way, the interior of the coupling pipe 76 communicates with the interior of the partition rolling core 38 via the rotating shaft 38B. As a result, the gas that is supplied from the inflator 72 is delivered to the partition rolling core 38 via the coupling pipe 76 and the rotating shaft 38B and is then delivered from the injection holes 38A of the partition rolling core 38 to the interior of the partition 32 (see arrows in FIG. 4).

(Collision Prediction Sensor and Collision Detection Sensor) Actuation of the above-described inflator 72 is controlled by the control ECU 48 illustrated in FIG. 5. As an example, the collision detection sensor 82 and the collision prediction sensor 84 are connected to an input side of the control ECU 48 (see FIG. 5). As an example, the collision detection sensor 82 is configured to include: a right and left pair of satellite sensors attached each of a front end and a rear end of the vehicle 12; and a center collision detection sensor arranged under a console box, and detects longitudinal acceleration respectively generated at the front end and the rear end of the vehicle by a vehicle front collision and a vehicle rear collision. In this way, the collision detection sensor 82 mainly detects the vehicle front collision and the vehicle rear collision.

The collision prediction sensor 84 is configured to include at least one of a millimeter-wave radar, a laser radar, a monocular camera, a stereo camera, an infrared camera, and the like, for example, and detects another vehicle, an obstacle, or the like present in front of or behind the vehicle. In this way, the collision prediction sensor 84 predicts the collisions of the vehicle (mainly, the vehicle front collision and the vehicle rear collision). The inflator 72 and the like are connected to an output side of the control ECU 48.

Figure 8:
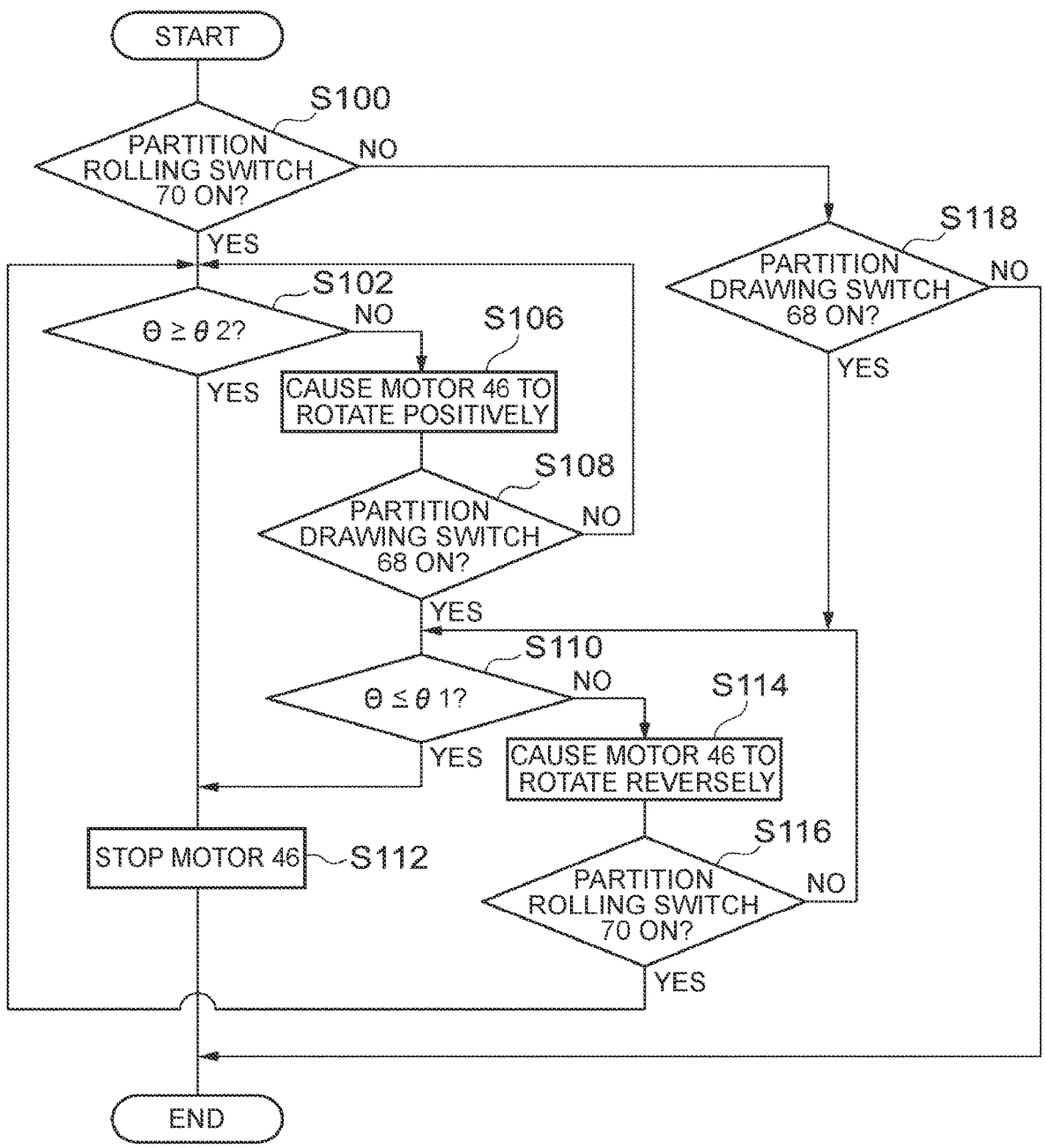
FIG. 8 is a flowchart illustrating an operation procedure of the occupant protective apparatus according to the first embodiment during a normal time.

(Processing Flow) Next, a description will be made on action of the occupant protective apparatus 10. FIG. 8 is a flowchart illustrating an operation procedure of the occupant protective apparatus 10. The CPU in the control ECU 48 reads the partition actuation program from the ROM or a storage, loads the partition actuation program into the RAM, and thereby brings the partition 32 into the shielding state or the non-shielding state.

The CPU in the control ECU 48 determines whether the partition rolling switch 70 is ON (step S100). If the partition rolling switch 70 is OFF (step S100: NO), the CPU determines whether the partition drawing switch 68 is ON (step S118). If the partition drawing switch 68 is OFF (step S118: NO), the CPU terminates the processing based on the partition actuation program. If the partition drawing switch 68 is ON (step S118: YES), the processing proceeds to step S110, which will be described later.

Meanwhile, if the partition rolling switch 70 is ON (step S100: YES), the CPU determines whether the angle θ of the partition rolling core 38 is equal to or larger than the rolling reference angle θ2 (step S102). If the angle θ is equal to or larger than the rolling reference angle θ2 (step S102: YES), the CPU determines that the partition 32 cannot be rolled anymore, that is, is in the non-shielding state, refrains from rotating the motor 46 (maintain a stopped state, step S112), and terminates the processing based on the partition actuation program.

If the angle θ of the partition rolling core 38 is smaller than the rolling reference angle θ2 (step S102: NO), the CPU causes the motor 46 to rotate positively (step S106). Then, the CPU determines whether the partition drawing switch 68 is ON (step S108). If the partition drawing switch 68 is OFF (step S108: NO), the processing returns to step S102. On the other hand, if the partition drawing switch 68 is ON (step S108: YES), the CPU determines whether the angle θ of the partition rolling core 38 is smaller than the drawing reference angle θ1 (step S110). If the angle θ of the partition rolling core 38 is smaller than the drawing reference angle θ1 (step S110: YES), the CPU stops the motor 46 (step S112), and thereafter terminates the processing based on the partition actuation program. If the angle θ of the partition rolling core 38 exceeds the drawing reference angle θ1 (step S110: NO), the CPU causes the motor 46 to rotate reversely (step S114). Then, the CPU determines whether the partition rolling switch 70 is ON (step S116). If the partition rolling switch 70 is OFF (step S116: NO), the processing returns to step S110. On the other hand, if the partition rolling switch 70 is ON (step S116: YES), the processing returns to step S102.

Figure 9:
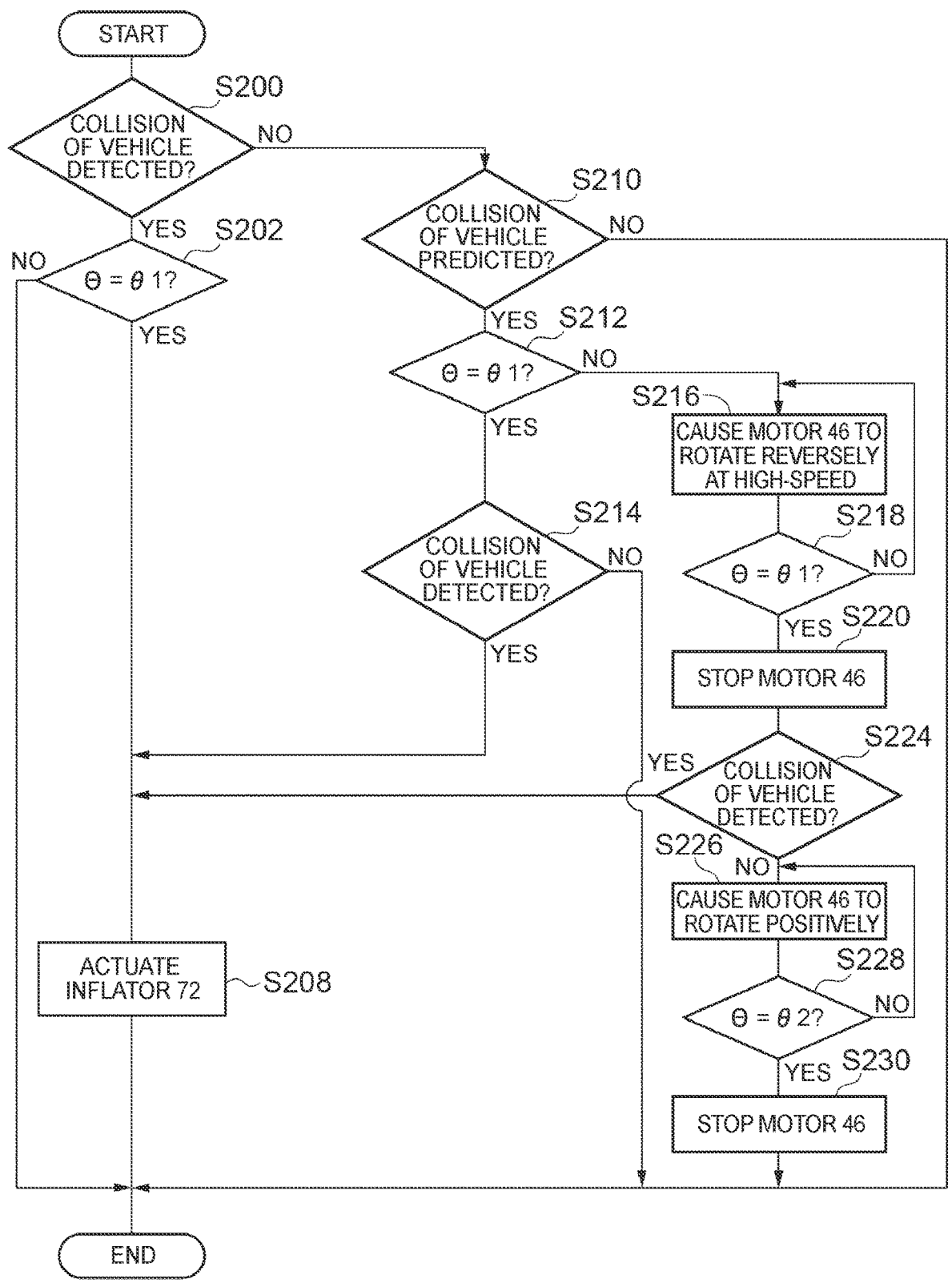
FIG. 9 is a flowchart illustrating an operation procedure of the occupant protective apparatus according to the first embodiment during a collision of the vehicle.
Figure 10:
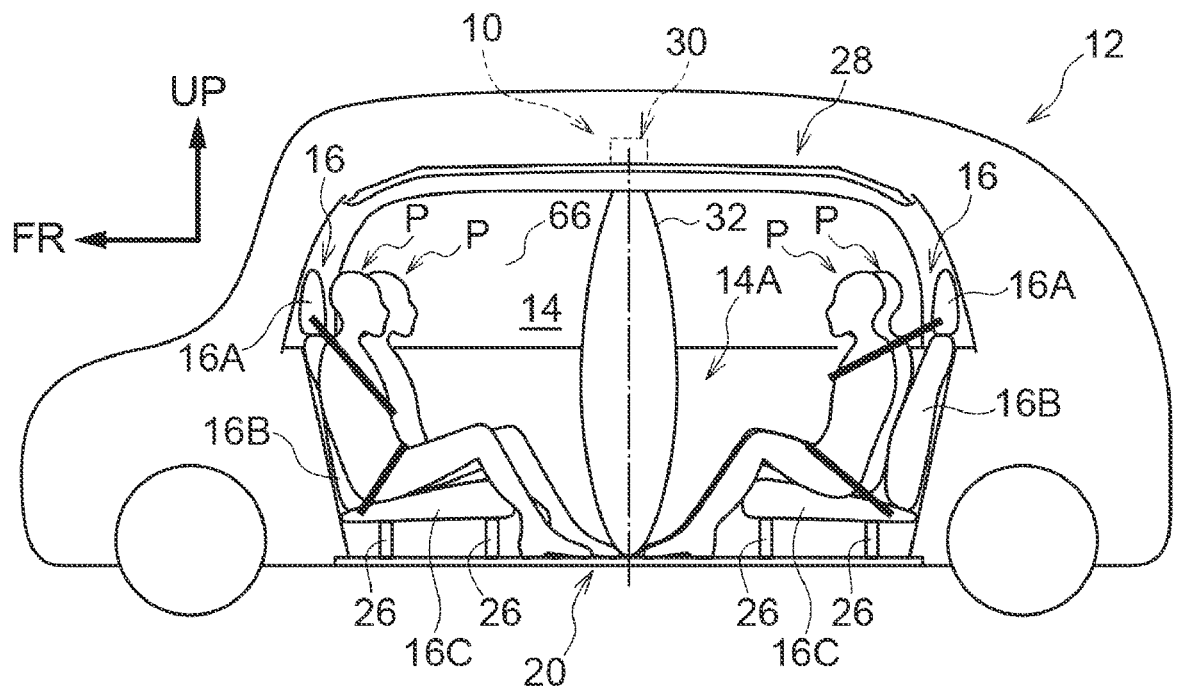
FIG. 10 is a side view schematically illustrating an initial state during the collision of the vehicle including the occupant protective apparatus according to the first embodiment.

Next, a description will be made on action of the occupant protective apparatus 10 during the collision of the vehicle. FIG. 9 is a flowchart illustrating an operation procedure of the occupant protective apparatus 10 during the collision of the vehicle. The CPU in the control ECU 48 reads the partition inflation program from the ROM or the storage, loads the partition inflation program into the RAM, and thereby inflates the partition 32 and brings the partition 32 into the shielding state.

Figure 11:
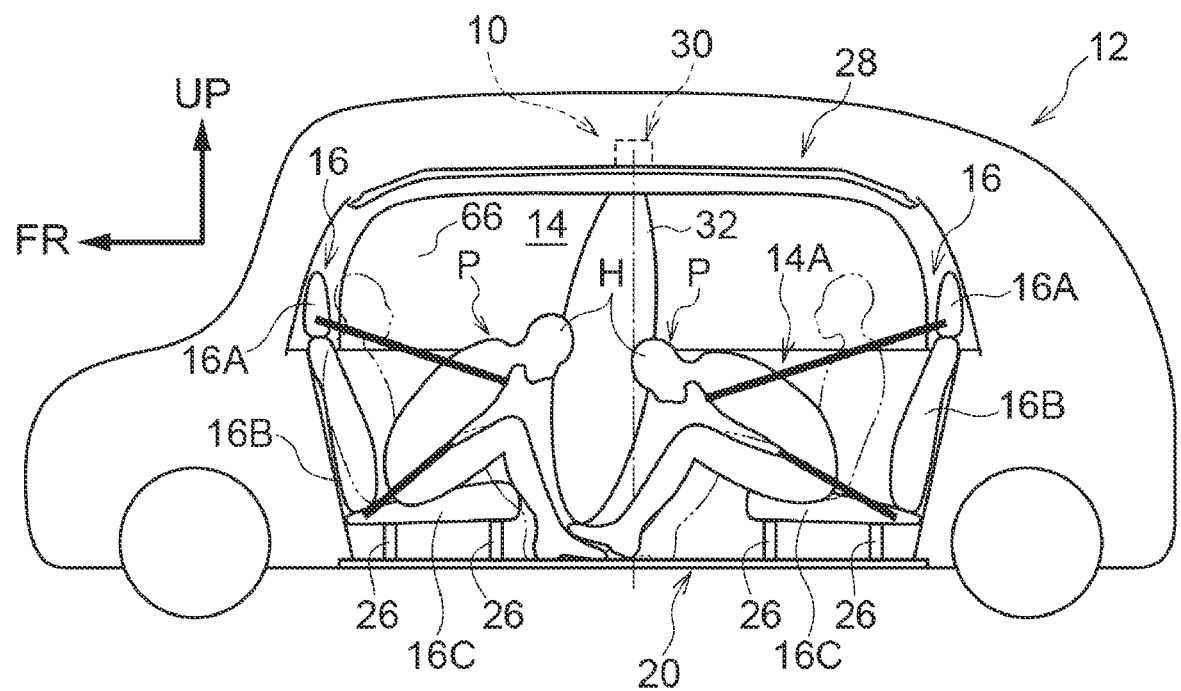
FIG. 11 is a side view schematically illustrating a later state during the collision of the vehicle including the occupant protective apparatus according to the first embodiment.

The CPU in the control ECU 48 determines whether the collision detection sensor 82 has detected the collision of the vehicle (step S200). If the collision detection sensor 82 has detected the collision of the vehicle (step S200: YES), the CPU determines whether the angle θ of the partition rolling core 38 is equal to the drawing reference angle θ1 (step S202). If the angle θ of the partition rolling core 38 is equal to the drawing reference angle θ1 (step S202: YES), that is, if the partition 32 is in the shielding state, the CPU actuates the inflator 72 (step S208), and thereafter terminates the processing based on the partition inflation program. In this way, the partition 32 is inflated (see FIG. 10) and restrains the occupant P displaced in the vehicle longitudinal direction by a collision load (see FIG. 11). FIG. 11 illustrates a state where, during the vehicle front collision, primarily the head H of the occupant P, who is seated on the vehicle seat 16 on the vehicle rear side, moves forward in the vehicle due to inertial movement and is restrained by the inflated partition 32 and primarily the head H of the occupant P, who is seated on the vehicle seat 16 on the vehicle front side, receives a reaction force from the vehicle seat 16, moves (rebounds) rearward in the vehicle, and is restrained by the inflated partition 32.

On the other hand, as illustrated in FIG. 9, if the angle θ of the partition rolling core 38 is not equal to the drawing reference angle θ1 (step S202: NO), that is, if the partition 32 is in the non-shielding state, the CPU terminates the processing based on the partition inflation program.

In addition, if the collision detection sensor 82 does not detect the collision of the vehicle (step S200: NO), the CPU determines whether the collision prediction sensor 84 has predicted the collision of the vehicle (step S210). If the collision prediction sensor 84 does not predict the collision of the vehicle (step S210: NO), the CPU terminates the processing based on the partition inflation program.

If the collision prediction sensor 84 has predicted the collision of the vehicle (step S210: YES), the CPU determines whether the angle θ of the partition rolling core 38 is equal to the drawing reference angle θ1 (step S212). If the angle θ of the partition rolling core 38 is equal to the drawing reference angle θ1 (step S212: YES), that is, if the partition 32 is already in the shielding state, the CPU determines whether the collision detection sensor 82 has detected the collision of the vehicle (step S214). If the collision detection sensor 82 has detected the collision of the vehicle (step S214: YES), the CPU actuates the inflator 72 (step S208), and terminates the processing based on the partition inflation program. If the collision detection sensor 82 does not detect the collision of the vehicle (step S214: NO), the CPU terminates the processing based on the partition inflation program.

On the other hand, if the angle θ of the partition rolling core 38 is not equal to the drawing reference angle θ1 (step S212: NO), that is, if the partition 32 is in the non-shielding state, the CPU causes the reverse rotation of the motor 46 at a higher speed than that in a normal state (step S216). At this time, the motor 46 is set to rotate reversely at the higher rotation speed than that at the time when the motor 46 rotates reversely in a period other than the collision of the vehicle, that is, in the normal state. That is, as illustrated in FIG. 7, in the case where the CPU detects the collision of the vehicle and causes the motor 46 to rotate reversely, as indicated by a portion between points Pf in FIG. 7, the motor 46 rotates reversely at the higher rotation speed than that in the normal state until the angle θ of the partition rolling core 38 reaches the drawing reference angle θ1. In this way, the partition 32 can promptly be brought into the shielding state.

Then, the CPU determines whether the angle θ of the partition rolling core 38 is equal to the drawing reference angle θ1 (step S218). If the angle θ of the partition rolling core 38 is not equal to the drawing reference angle θ1 (step S218: NO), the processing returns to step S216.

If the angle θ of the partition rolling core 38 is equal to the drawing reference angle θ1 (step S218: YES), the CPU stops the motor 46 (step S220). Then, the CPU determines whether the collision detection sensor 82 has detected the collision of the vehicle (step S224). If the collision detection sensor 82 has detected the collision of the vehicle (step S224: YES), the CPU actuates the inflator 72 (step S208), and terminates the processing based on the partition inflation program.

On the other hand, if the collision detection sensor 82 does not detect the collision of the vehicle (step S224: NO), the CPU causes the motor 46 to rotate positively (step S226). In this way, the partition 32, which has brought into the shielding state from the non-shielding state due to the prediction of the collision, returns to the non-shielding state again. The CPU determines whether the angle θ of the partition rolling core 38 is equal to the rolling reference angle θ2 (step S228). If the angle θ of the partition rolling core 38 is not equal to the rolling reference angle θ2 (step S228: NO), the processing returns to step S226. If the angle θ of the partition rolling core 38 is equal to the rolling reference angle θ2 (step S228: YES), that is, if the partition 32 is brought into the shielding state, the CPU stops the motor 46 (step S230), and thereafter terminates the processing based on the partition inflation program.

(Action and Effects of First Embodiment) Next, a description will be made on action and effects of this embodiment.

As illustrated in FIG. 2, in this embodiment, the occupant protective apparatus 10 includes the collision detection sensor 82, the inflator 72, and the partition 32. Of these, the partition 32 is provided between the pair of the vehicle seats 16 that are arranged to oppose each other in the vehicle longitudinal direction in the cabin 14, and can selectively be brought into the shielding state or the non-shielding state. That is, even in the case where the partition 32 is brought into the shielding state when the pair of the opposing vehicle seats 16 each adopt a comfortable state where the seat back 16B of the vehicle seat 16 is reclined significantly or a relaxing state where the vehicle seat 16 is slid to a secure sufficient legroom, the partition 32 is less likely to interfere with the vehicle seats 16. For such a reason, the partition 32 in the shielding state extends from an upper portion to a lower portion of the cabin 14 in such a manner as to partition a space between the pair of the opposing vehicle seats 16. Thus, with the partition 32 in the shielding state, lines of sight of the occupants P who are seated on the vehicle seats 16 can be blocked. In addition, the partition 32 in the non-shielding state is stored in the specified position. Thus, in the case where the occupant P is seated on one of the vehicle seats 16, or the like, the partition 32 is brought into the non-shielding state, which can provide a sense of openness.

Meanwhile, in the case where the partition 32 is in the shielding state during the collision of the vehicle 12, the partition 32 is inflated by the gas supplied from the inflator 72, which is actuated when the collision detection sensor 82 detects the collision of the vehicle 12, in such a manner as to be thickened in the vehicle longitudinal direction. That is, since the partition 32 is inflated in the space between the pair of the vehicle seats 16 without interfering with the vehicle seats 16, the partition 32 can further reliably restrain the occupant P who receives the collision load and is thereby displaced in the vehicle longitudinal direction from the vehicle seat 16. In this way, it is possible to easily secure the private space in the cabin 14 and to improve restraint performance for the occupant P.

In addition, the partition 32 can be stored in the partition storage case 34 in the normal time. In other words, the partition 32, which serves as an airbag inflated during the collision of the vehicle, is stored in the partition storage case 34, a space for storing the airbag is unnecessary. Thus, the space for storing the partition 32 can be used effectively. In this way, a space inside the vehicle can be used effectively.

Furthermore, in the non-shielding state, the partition 32 is stored in a rolled state around the partition rolling core 38. This partition rolling core 38 is provided on the ceiling 28 of the cabin 14, is formed in the cylindrical shape, and is formed with a plurality of the injection holes 38A. The gas supplied from the inflator 72 is supplied into the partition 32 via each of these injection holes 38A. Thus, the gas can be supplied into the partition 32 with the simple configuration. In this way, the space for storing the partition 32 can be used effectively.

Moreover, in the case where the partition 32 is in the non-shielding state when the collision prediction sensor 84, which predicts the collision of the vehicle 12, predicts the collision of the vehicle 12, the partition 32 is brought into the shielding state more promptly than in the normal time. Thus, it is possible to further reliably restrain the occupant P during the collision of the vehicle. That is, even in the case where the partition 32 does not extend from the upper portion to the lower portion of the cabin 14, the partition 32 is promptly brought into the shielding state, in which the partition 32 extends from the upper portion to the lower portion of the cabin 14, at a stage at which the collision is predicted. Accordingly, the partition 32 can be inflated promptly during the collision of the vehicle. Thus, it is possible to further reliably restrain the occupant P who receives the collision load and is displaced in the vehicle longitudinal direction from the vehicle seat 16. In this way, it is possible to further improve the restraint performance for the occupant P.

Since the lower end portion 32B of the partition 32 in the shielding state can be held by the floor 20 of the cabin 14, the partition 32 in the shielding state can be suppressed from flopping due to input of a load from a leg L of the occupant P, inertia during travel of the vehicle, or the like. In this way, it is possible to improve NV performance.

Furthermore, since the lower end portion 32B of the partition 32 in the shielding state is held by the floor 20 of the cabin 14, it is possible to suppress the partition 32 from being displaced during the inflation. Thus, the partition 32 can stably be inflated.

Moreover, the partition 32 can be stored in the partition storage case 34. This partition storage case 34 extends in a seat width direction and is attached at plural positions in the longitudinal direction of the partition storage case 34, that is, the ends 34B to the roof side rails 44. That is, the vehicle body frameworks can be coupled to each other by the case. In this way, it is possible to improve flexural rigidity of the vehicle body framework.

In the above-described embodiment, it is configured that, when the collision prediction sensor 84 predicts the collision of the vehicle, the partition 32 is brought into the shielding state. However, an applicable embodiment of the present disclosure is not limited thereto. It may be configured that, only in the case where the collision detection sensor 82 detects the collision of the vehicle, the partition 32 is brought into the shielding state.

(Second Embodiment) Next, a description will be made on an occupant protective apparatus according to a second embodiment of the present disclosure with reference to FIG. 12 and FIG. 13. Note that the same components as those in the above-described first embodiment and the like will be denoted by the same reference numerals and symbols and the description thereon will not be made.

An occupant protective apparatus 90 according to this second embodiment has the same basic configuration as that in the first embodiment, and has a characteristic in a point that a partition 92 is provided with an exterior skin 94.

Figure 12:
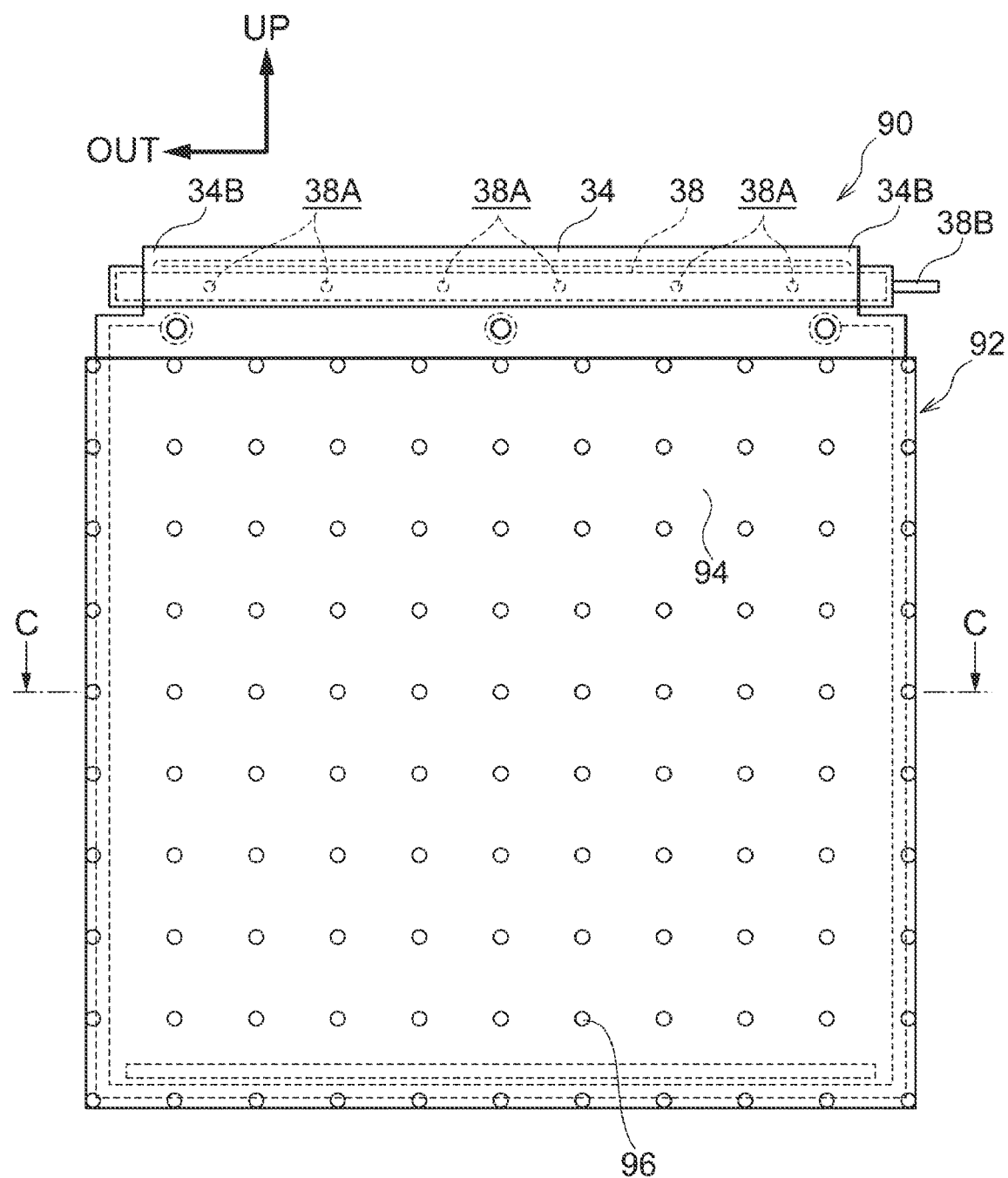
FIG. 12 is a front view illustrating an inflated state of an occupant protective apparatus according to a second embodiment.
Figure 13:
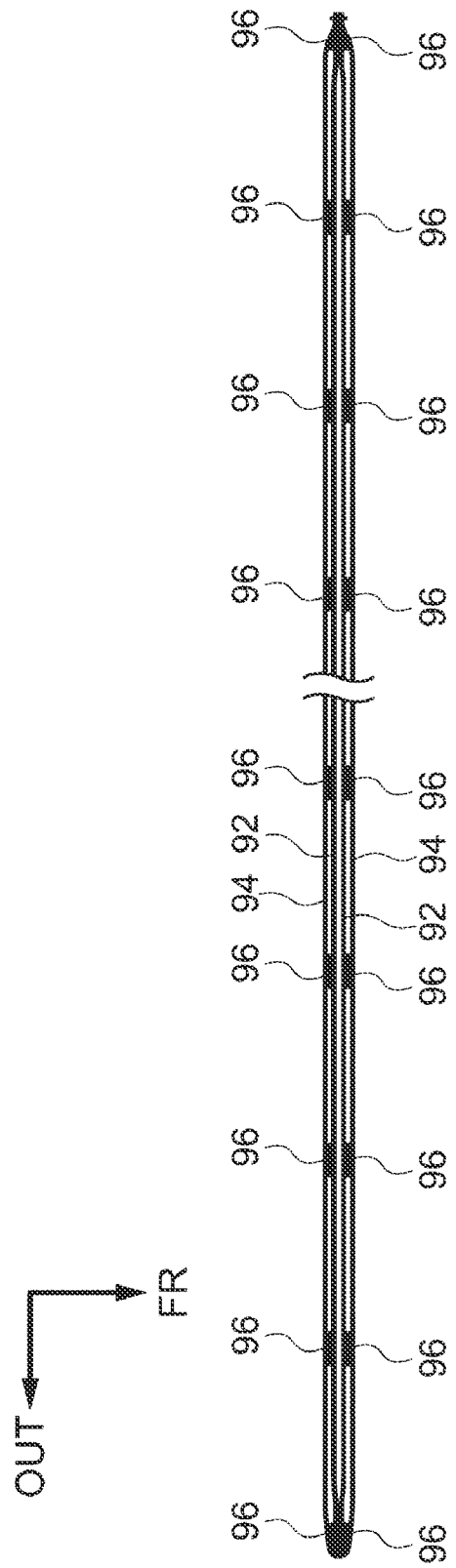
FIG. 13 is an enlarged cross-sectional view illustrating a state that is taken along line C-C in FIG. 12.

That is, as illustrated in FIG. 12, the exterior skin 94 is provided on a cabin 14 inner side, that is, a surface of the partition 92. As an example, this exterior skin 94 is formed of a cloth material in the substantially same shape as the partition 92 in the shielding state when seen from the front of the vehicle. A pair of the exterior skin 94 is provided in such a manner as to hold the partition 92 therebetween in the vehicle longitudinal direction. This exterior skin 94 is locked to the partition 92 by a plurality of locking sections 96. As an example, each of the locking sections 96 locks the exterior skin 94 and the partition 92 by adhesion (see FIG. 13). An adhesive force of the locking section 96 is set to such an amount that a locked state between the exterior skin 94 and the partition 92 is canceled when the partition 92 is inflated.

(Action and Effects of Second Embodiment) Next, a description will be made on action and effects of the second embodiment.

Also, in the above configuration, the occupant protective apparatus is configured to be the same as the occupant protective apparatus in the first embodiment except for the point that the exterior skin 94 is provided on the partition 92. Thus, the same effects as those in the first embodiment can be obtained. In addition, the exterior skin 94 is locked to the surface of the partition 92 by the locking sections 96. Accordingly, it is possible to improve appearance of the partition 92 in the normal time. Meanwhile, each of the locking sections 96 cancels the locked state between the exterior skin 94 and the partition 92 when the partition 92 is inflated. Thus, it is possible to suppress the inflation of the partition 92 from being hindered by the exterior skin 94 during the collision of the vehicle. In this way, it is possible to simultaneously improve exterior design and the restraint performance for the occupant P.

(Third Embodiment) Next, a description will be made on an occupant protective apparatus according to a third embodiment of the present disclosure with reference to FIG. 14 and FIG. 15. Note that the same components as those in the above-described first embodiment and the like will be denoted by the same reference numerals and symbols and the description thereon will not be made.

A basic configuration of an occupant protective apparatus 100 according to this third embodiment is the same as that in the first embodiment. The occupant protective apparatus 100 has a characteristic in a point of being set that a thickness dimension in the vehicle longitudinal direction of a partition upper portion 102A of a partition 102 during the inflation becomes larger than a thickness dimension in the vehicle longitudinal direction of a partition lower portion 102B during the inflation.

Figure 14:
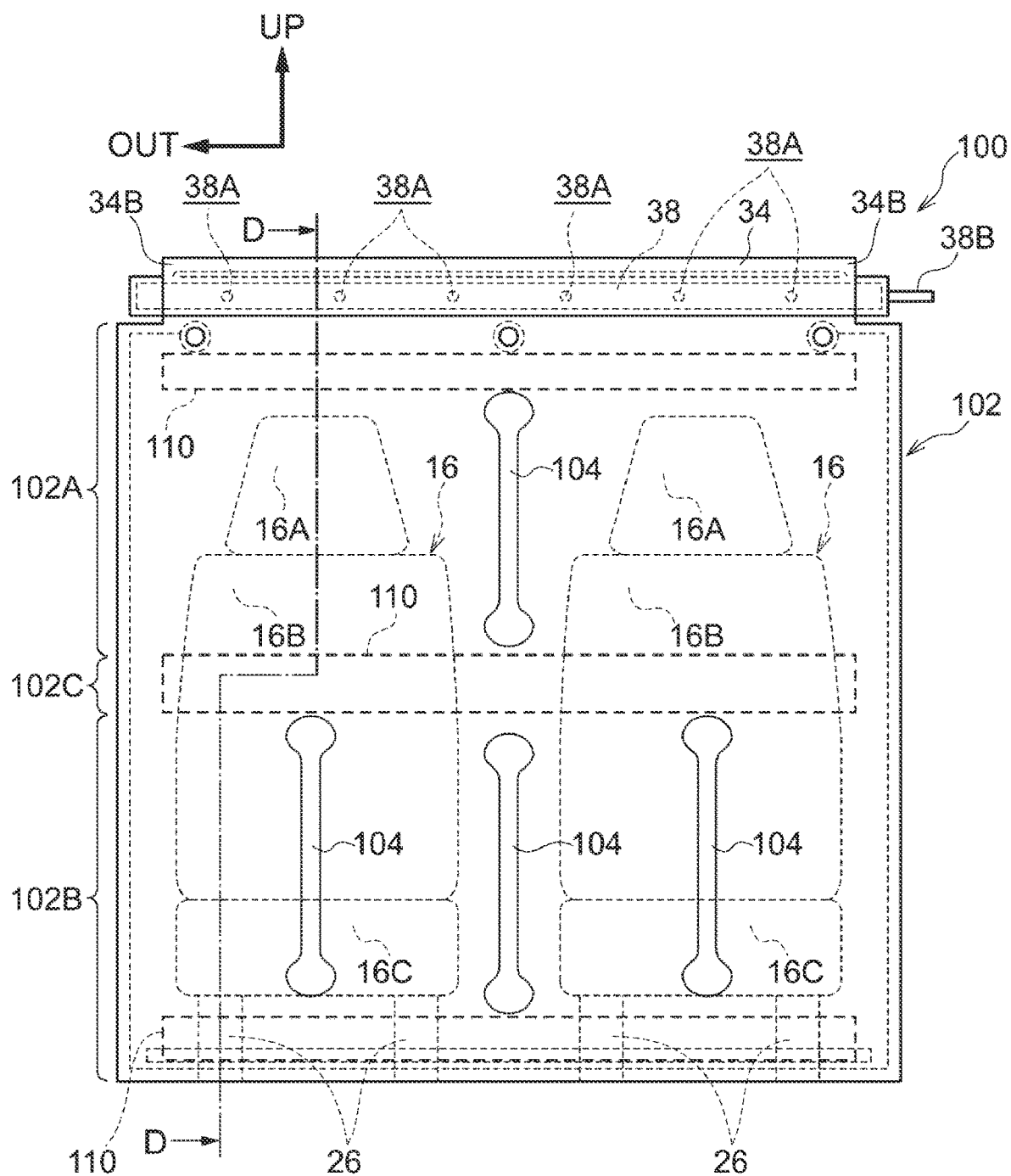
FIG. 14 is a front view illustrating a shielding state of an occupant protective apparatus according to a third embodiment.
Figure 15:
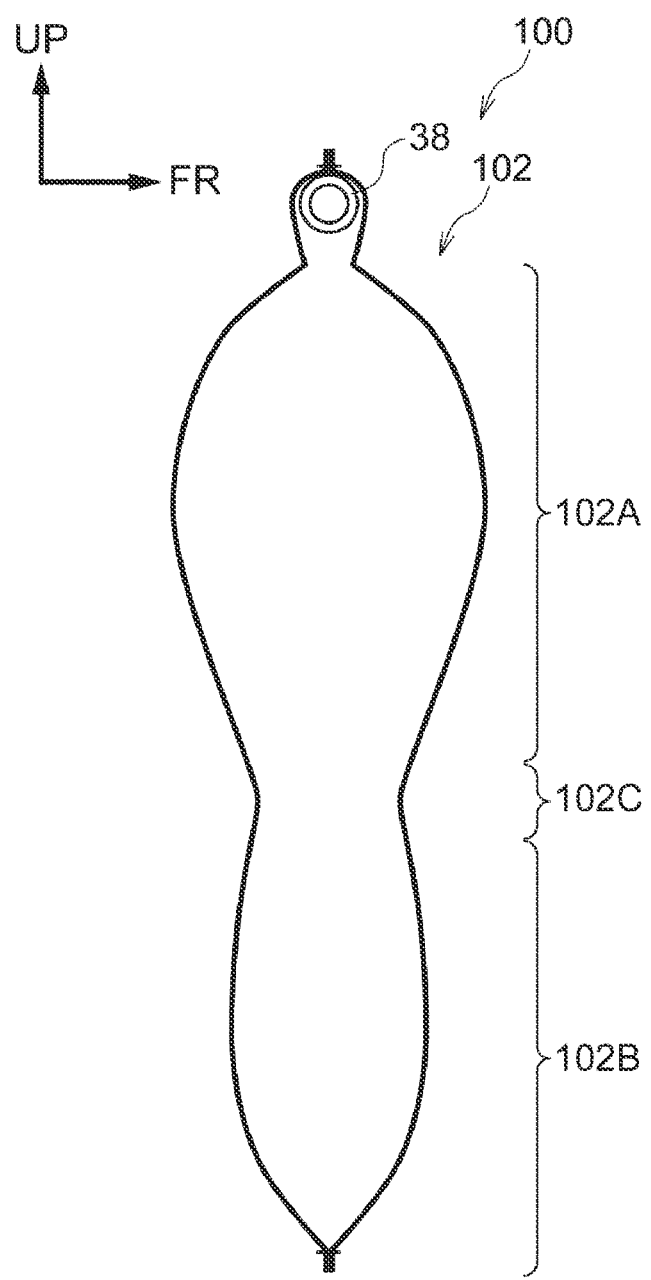
FIG. 15 is an enlarged cross-sectional view illustrating a state that is taken along line D-D in FIG. 14.

More specifically, as illustrated in FIG. 14, the partition 102 is provided with a plurality of uninflated sections 104. In an annular sewed section that is in a substantially linear shape and has the vehicle vertical direction as a longitudinal direction, a cloth member (a base fabric) on the vehicle front side and a cloth member (a base fabric) on the vehicle rear side, which constitute the partition 102, are sewn to each other. In this way, each of these uninflated sections 104 restricts inflow of the gas. The uninflated section 104 is provided in each of the partition upper portion 102A and the partition lower portion 102B. The partition upper portion 102A is a portion of the partition 102 in the shielding state that is on the vehicle upper side of a substantially center portion 102C in the vehicle vertical direction. The partition lower portion 102B is a portion of the partition 102 in the shielding state on the vehicle lower side of the substantially center portion 102C in the vehicle vertical direction. The uninflated section 104 provided in the partition upper portion 102A is provided at one position in a substantially center portion in the vehicle width direction when seen from the front of the vehicle.

The uninflated section 104 provided in the partition lower portion 102B is provided at three positions that are the substantially center portion in the vehicle width direction and a portion corresponding to a substantially center portion in the seat width direction of each of the right and left vehicle seats 16 when seen from the front of the vehicle.

The uninflated sections 104 provided in the substantially center portions in the vehicle width direction of the partition upper portion 102A and the partition lower portion 102B are provided at the substantially same position in the vehicle width direction and to be separated from each other in the vehicle vertical direction. A vehicle upper end of the uninflated section 104 in the partition upper portion 102A is arranged to be separated from an upper end of the partition 102 in the vehicle vertical direction. Meanwhile, a vehicle lower end of the uninflated section 104 in the partition lower portion 102B is arranged to be separated from a lower end of the partition 102 in the vehicle vertical direction. That is, a communicating section 110 (a portion indicated by a broken line in FIG. 14), which extends in the vehicle width direction and in which the gas can communicate, is provided on an outer side in the vehicle vertical direction in each of the partition upper portion 102A and the partition lower portion 102B.

(Action and Effects of Third Embodiment) Next, a description will be made on action and effects of the third embodiment.

The above configuration is the same as that of the occupant protective apparatus 10 according to the first embodiment except for the point of being set that the thickness dimension in the vehicle longitudinal direction of the partition upper portion 102A in the partition 102 during the inflation becomes larger than the thickness dimension in the vehicle longitudinal direction of the partition lower portion 102B during the inflation. Thus, the same effects as those in the first embodiment can be obtained. In addition, the partition 102 in the shielding state is provided with the partition upper portion 102A, which constitutes the portion on the vehicle upper side of the substantially center portion in the vehicle vertical direction. In general, when the occupant P who is seated on the vehicle seat 16 is displaced to the partition 102 side during the collision of the vehicle, the head H of the occupant P is likely to abut the partition upper portion 102A. In particular, in a vehicle in which a longitudinal length of the cabin 14 is short, a vehicle in which the partition 102 is arranged closer to one of the vehicle seats 16 than the other, a vehicle in which a ceiling height of the cabin 14 is low, or the like, the head H of the occupant P is likely to abut the partition upper portion 102A of the partition 102 during the collision of the vehicle. Since the thickness dimension in the vehicle longitudinal direction of this partition upper portion 102A during the inflation is set to be larger than that of the partition lower portion 102B, a sufficient shock absorbing stroke can be secured. Thus, it is possible to further effectively absorb the collision load applied to the head H of the occupant P. In this way, the occupant P can appropriately be restrained.

The partition 102 is provided with the plurality of the uninflated sections 104. Since the gas from the inflator 72 is not supplied into each of these uninflated sections 104, the thickness dimension in the vehicle longitudinal direction of the partition 102 during the inflation becomes smaller than that of the portion other than the uninflated sections 104, that is, an inflated section. That is, as the number of the uninflated sections 104 is increased, the thickness dimension in the vehicle longitudinal direction of the partition 102 during the inflation is reduced. As the number of the uninflated sections 104 is reduced, the thickness dimension in the vehicle longitudinal direction of the partition 102 during the inflation is increased. In addition, the uninflated sections 104 are provided in the partition upper portion 102A and the partition lower portion 102B of the partition 102 and the number of the uninflated sections 104 provided in the partition upper portion 102A is set to be smaller than the number of the uninflated sections 104 provided in the partition lower portion 102B. Accordingly, as illustrated in FIG. 15, with the simple configuration, the thickness dimension in the vehicle longitudinal direction of the partition upper portion 102A during the inflation of the partition 102 can be increased to be larger than that of the partition lower portion 102B. In this way, the occupant P can appropriately be restrained with the simple configuration.

The communicating section 110 is provided on each of the outer sides in the vehicle vertical direction of the uninflated sections 104. This communicating section 110 extends in the vehicle width direction, and is inflated when being supplied with the gas from the inflator 72. As a result, the communicating section 110 is continuously provided in the vehicle width direction during the inflation of the partition 102, and thus this communicating section 110 acts like a beam. Accordingly, the partition 102 is less likely to be bent in the vehicle width direction. Thus, it is possible to stably maintain an infrared, deployed shape. In this way, it is possible to further improve the restraint performance for the occupant P.

(Fourth Embodiment) Next, a description will be made on an occupant protective apparatus according to a fourth embodiment of the present disclosure with reference to FIG. 16. Note that the same components as those in the above-described first embodiment and the like will be denoted by the same reference numerals and symbols and the description thereon will not be made.

A basic configuration of an occupant protective apparatus 120 according to this fourth embodiment is the same as those in the first and third embodiments. The occupant protective apparatus 120 has a characteristic in a point that each of the uninflated sections 124 in a partition upper portion 122A and each of the uninflated sections 124 in a partition lower portion 122B of a partition 122 are arranged in line in the vehicle vertical direction during the inflation.

Figure 16:
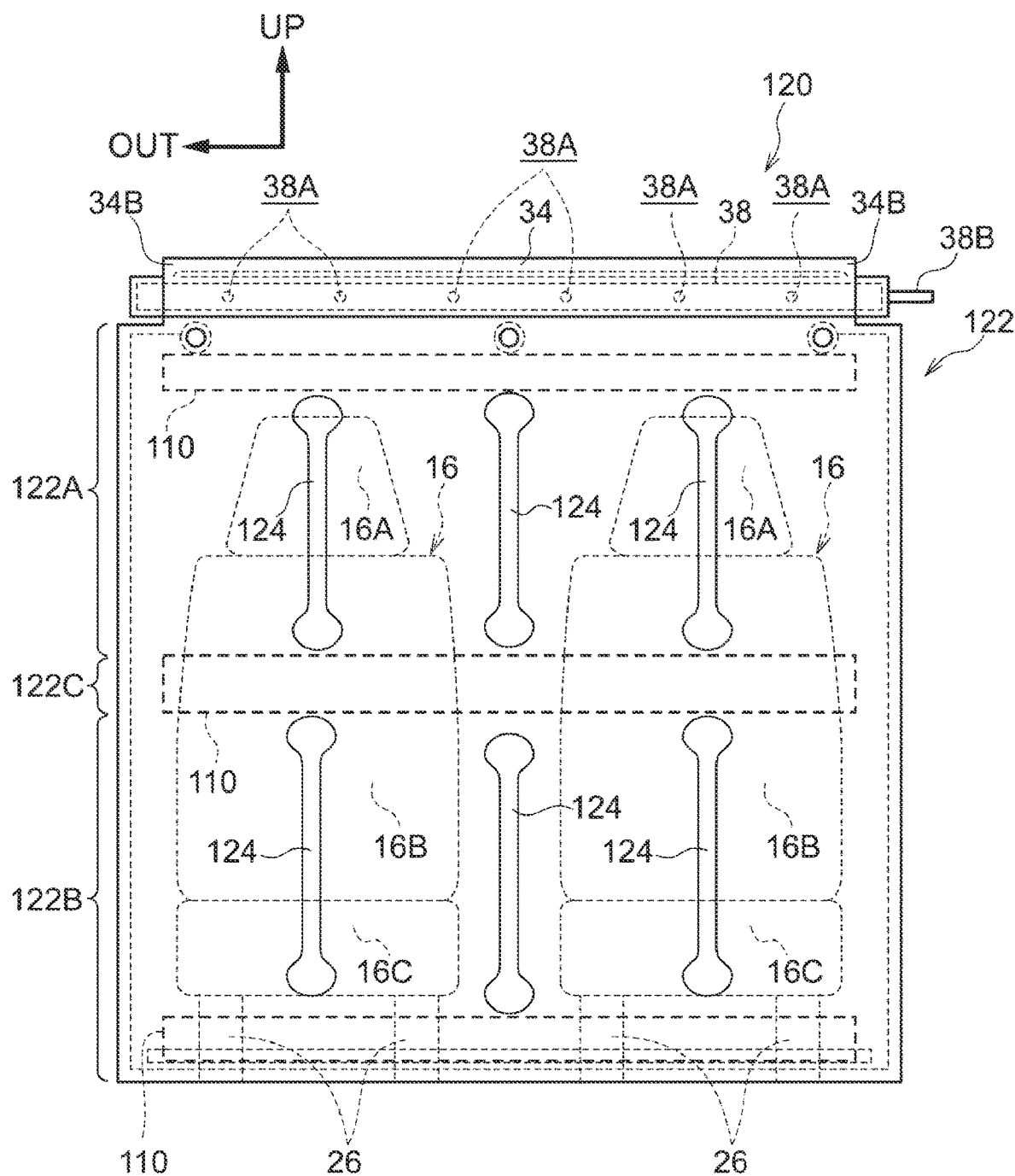
FIG. 16 is an enlarged cross-sectional view illustrating an inflated state of an occupant protective apparatus according to a fourth embodiment and corresponding to FIG. 14.

That is, as illustrated in FIG. 16, the partition 122 is provided with a plurality of the uninflated sections 124. In the annular sewed section that is in the substantially linear shape and has the vehicle vertical direction as the longitudinal direction, the cloth member (the base fabric) on the vehicle front side and the cloth member (the base fabric) on the vehicle rear side, which constitute the partition 122, are sewn to each other. In this way, each of these uninflated sections 124 restricts the inflow of the gas. The uninflated section 124 is provided in each of the partition upper portion 122A and the partition lower portion 122B. The partition upper portion 122A is a portion of the partition 122 in the shielding state that is on the vehicle upper side of a substantially center portion 122C in the vehicle vertical direction. The partition lower portion 122B is a portion of the partition 122 in the shielding state on the vehicle lower side of the substantially center portion 122C in the vehicle vertical direction. The uninflated section 124 provided in the partition upper portion 122A is provided at three positions that are the substantially center portion in the vehicle width direction and portions corresponding to a substantially center portion in the seat width direction of each of the right and left vehicle seats 16 when seen from the front of the vehicle.

The uninflated section 124 provided in the partition lower portion 122B is provided at three positions that are the substantially center portion in the vehicle width direction and a portion corresponding to the substantially center portion in the seat width direction of each of the right and left vehicle seats 16 when seen from the front of the vehicle. Accordingly, the uninflated sections 124 provided in the partition upper portion 122A and the partition lower portion 122B are arranged in line in the vehicle vertical direction.

The uninflated sections 124 provided in the substantially center portions in the vehicle width direction of the partition upper portion 122A and the partition lower portion 122B are provided at the substantially same position in the vehicle width direction and to be separated from each other in the vehicle vertical direction. A vehicle upper end of each of the uninflated sections 124 in the partition upper portion 122A is arranged to be separated from an upper end of the partition 122 in the vehicle vertical direction. Meanwhile, a vehicle lower end of each of the uninflated sections 124 in the partition lower portion 122B is arranged to be separated from a lower end of the partition 122 in the vehicle vertical direction. That is, the communicating section 110 (a portion indicated by a broken line in FIG. 16), which extends in the vehicle width direction and in which the gas can communicate, is provided on the outer side in the vehicle vertical direction in each of the partition upper portion 122A and the partition lower portion 122B.

(Action and Effects of Fourth Embodiment) Next, a description will be made on action and effects of the fourth embodiment.

The above configuration is the same as those of the occupant protective apparatuses 10, 100 according to the first and third embodiments except for the point that the uninflated sections 124 in the partition upper portion 122A and the uninflated sections 124 in the partition lower portion 122B of the partition 122 are provided at the substantially same positions in the vehicle width direction during the inflation. Thus, the same effects as those in the first and third embodiments can be obtained. In addition, the plurality of the uninflated sections 124 is provided in each of the partition upper portion 122A and the partition lower portion 122B of the partition 122. The uninflated sections 124 in the partition upper portion 122A and the uninflated sections 124 in the partition lower portion 122B are arranged in line in the vehicle vertical direction during the inflation of the partition 122. Accordingly, portions other than the uninflated sections 124 in the partition upper portion 122A and the partition lower portion 122B, that is, inflated sections continue in the vehicle vertical direction, and the inflated sections act as the columns during the inflation. Thus, the partition 122 is less likely to be bent in the vehicle longitudinal direction. As a result, it is possible to stably maintain the infrared, deployed shape. In this way, it is possible to further improve the restraint performance for the occupant P.

(Fifth Embodiment) Next, a description will be made on an occupant protective apparatus according to a fifth embodiment of the present disclosure with reference to FIG. 17 to FIG. 22. Note that the same components as those in the above-described first embodiment and the like will be denoted by the same reference numerals and symbols and the description thereon will not be made.

An occupant protective apparatus 130 according to this fifth embodiment has the same basic configuration as that in the first embodiment, and has a characteristic in a point that a partition 132 is provided with an additional bag 134.

Figure 20:
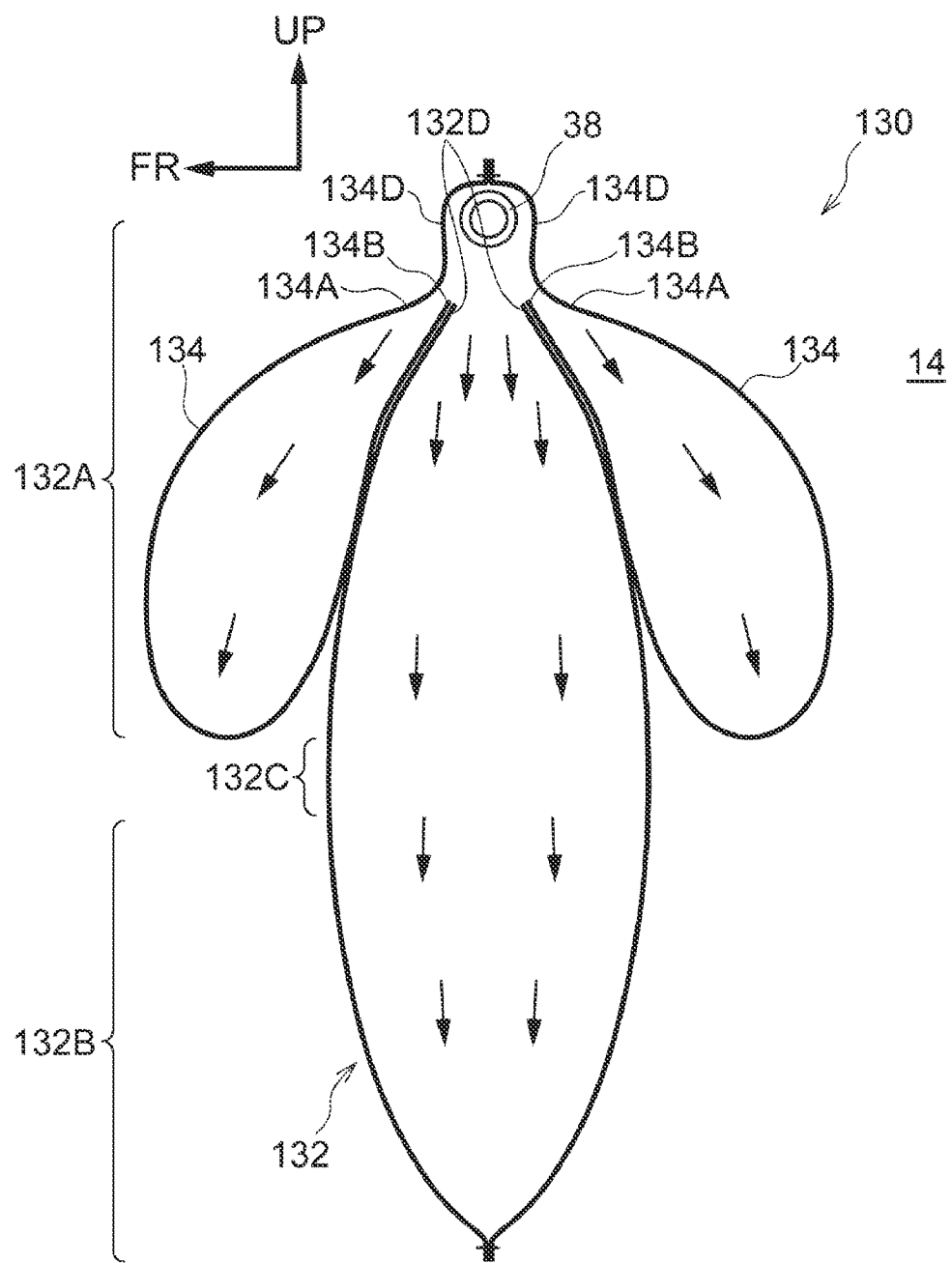
FIG. 20 is an enlarged cross-sectional view illustrating an inflated state of the occupant protective apparatus according to the fifth embodiment and corresponding to FIG. 18.

More specifically, as illustrated in FIG. 20, the partition 132 includes: a partition upper portion 132A that is a portion on the vehicle upper side of a substantially center portion 132C in the vehicle vertical direction of the partition 132 during the inflation; and a partition lower portion 132B that is a portion on the vehicle lower side of the substantially center portion 132C in the vehicle vertical direction. In the vehicle longitudinal direction, a pair of the additional bags 134 is provided on outer sides of the partition upper portion 132A in the vehicle longitudinal direction, that is, cabin 14 inner sides of the partition upper portion 132A. The additional bags 134 have symmetric structures in the vehicle longitudinal direction. Thus, the additional bag 134 on one of the sides in the vehicle longitudinal direction will not be described.

Figure 19:
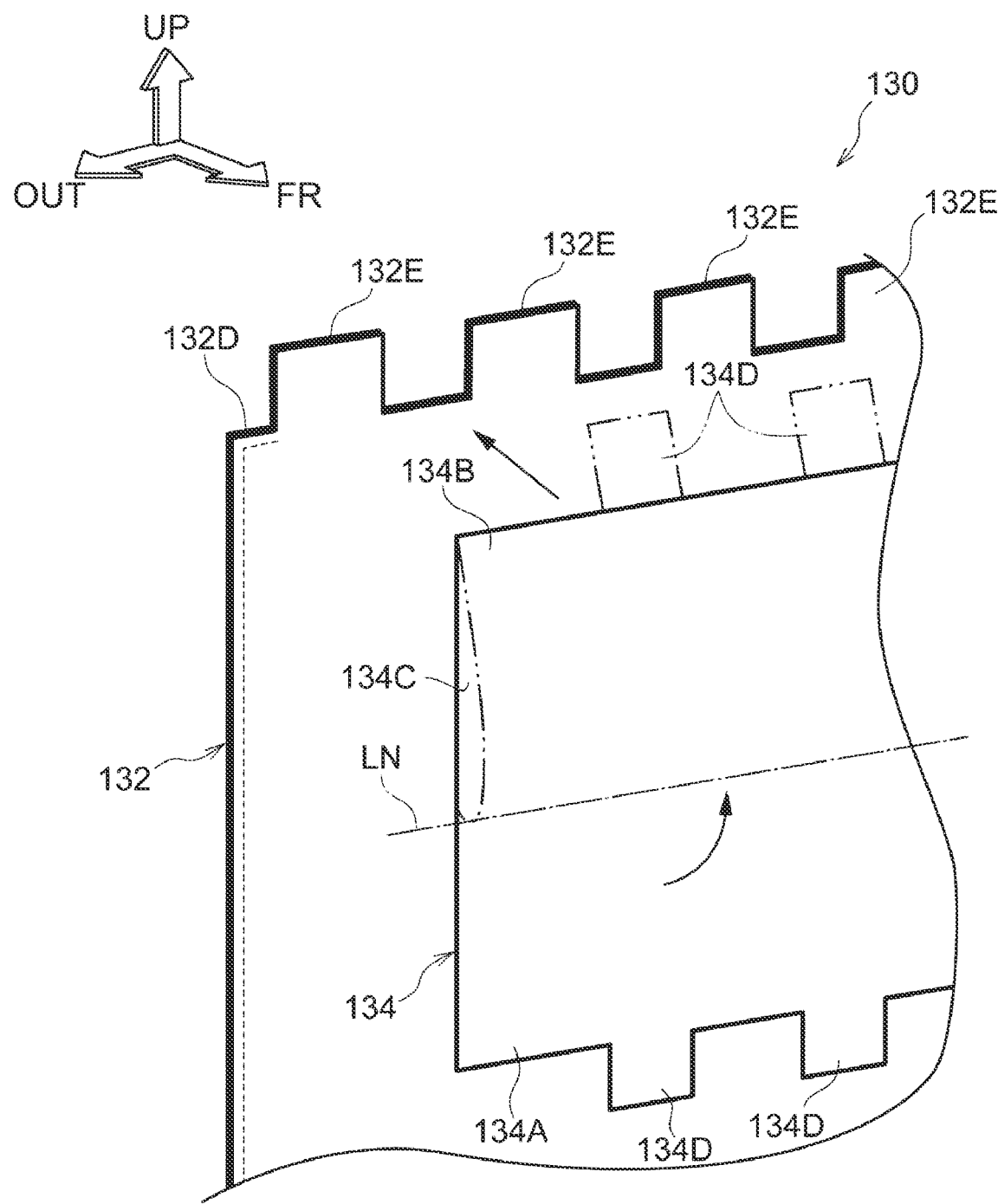
FIG. 19 is an exploded perspective view illustrating a partition of the occupant protective apparatus according to the fifth embodiment.

As an example, as illustrated in FIG. 19, in the additional bag 134, a single cloth member (a base fabric) in a deployed state in the vehicle vertical direction is folded on a double-folded line LN so as to be double-folded in the vehicle longitudinal direction. The double-folded line LN extends in the vehicle width direction such that a vehicle lower end 134A and a vehicle upper end 134B overlap each other in the vehicle longitudinal direction (see two-dot chain lines in FIG. 19). Then, folded ends 134C on each outer side in the vehicle width direction are sewn along the vehicle vertical direction (see FIG. 17). In addition, the end 134A is provided with a plurality of fixed projections 134D, each of which extends in the vehicle vertical direction in the deployed state, with spaced intervals provided therebetween in the vehicle width direction.

The partition 132 is provided with a pair of the cloth members (the base fabrics), each of which is shaped in a rectangular shape, has the vehicle longitudinal direction as a thickness direction, and has the vehicle vertical direction as a longitudinal direction, in the vehicle longitudinal direction. Then, outer circumferential ends the cloth members are sewn. In this way, the partition 132 is formed in the bag shape. In addition, an upper end 132D of the partition 132 is provided with a plurality of fixed projections 132E, each of which extends upward in the vehicle in the deployed state, with space intervals provided therebetween in the vehicle width direction.

Figure 17:
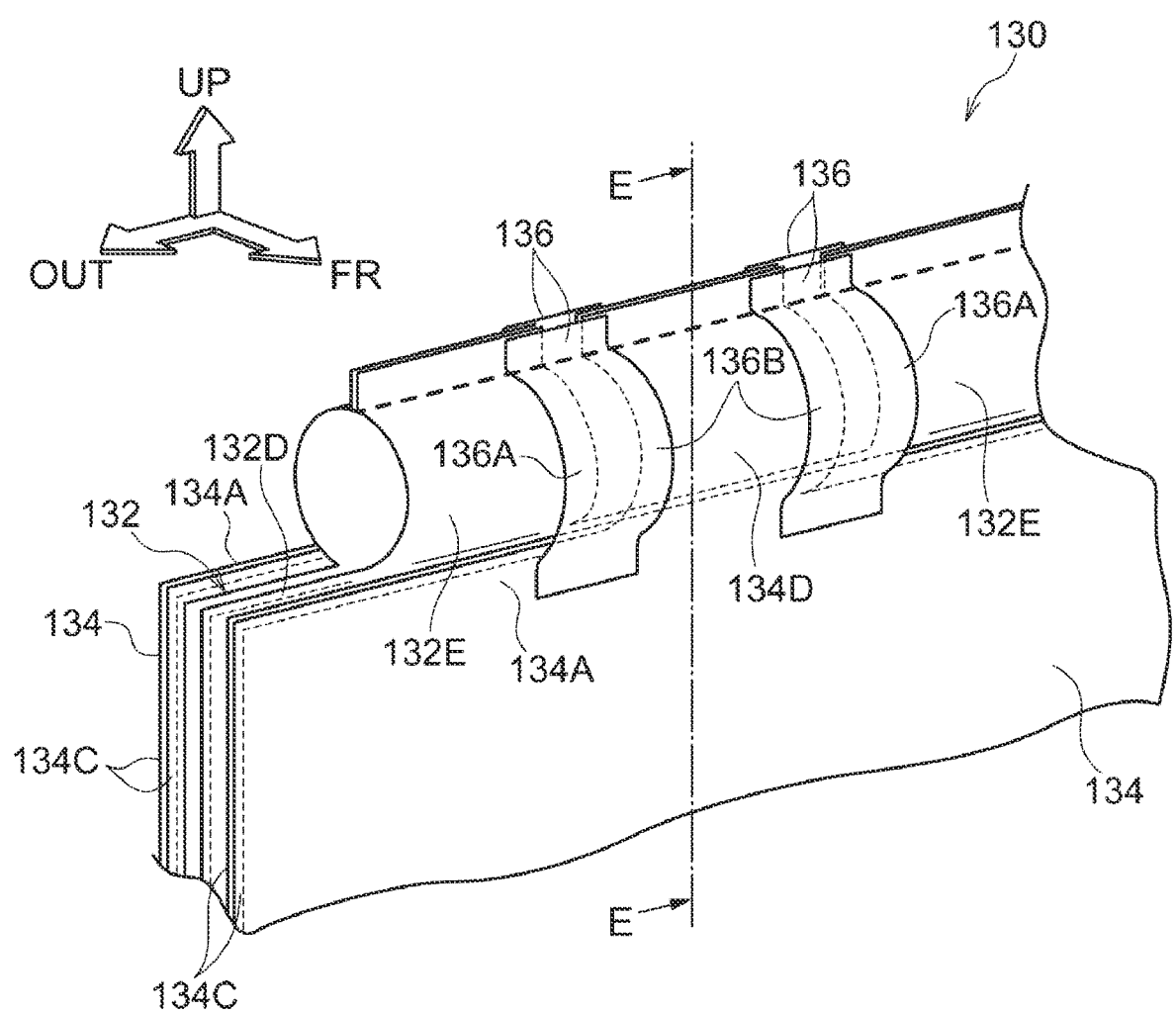
FIG. 17 is a perspective view schematically illustrating main sections of an occupant protective apparatus according to a fifth embodiment.
Figure 18:
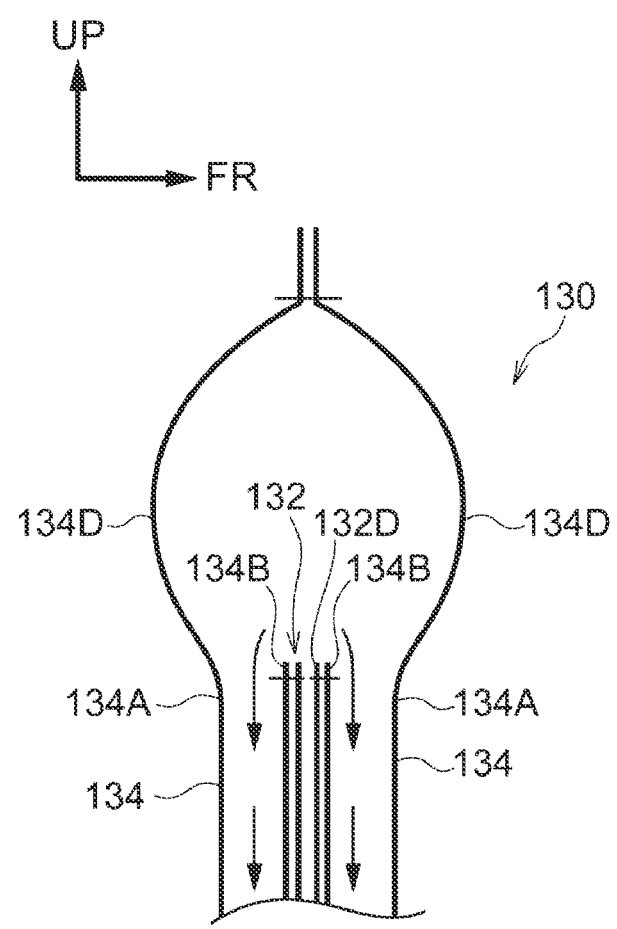
FIG. 18 is an enlarged cross-sectional view illustrating a state that is taken along line E-E in FIG. 17.

As illustrated in FIG. 17, each of the fixed projections 134D and each of the fixed projections 132E are arranged at positions that do not overlap each other in the vehicle width direction. More specifically, each of the fixed projections 134D is provided between one of the fixed projections 132E and the other of the fixed projections 132E that are separated in the vehicle width direction. Then, a coupling cloth 136 is provided between each adjacent pair of the fixed projection 134D and the fixed projection 132E. The coupling cloth 136 is a rectangular cloth member that has the vehicle longitudinal direction as a thickness direction and has the vehicle vertical direction as a longitudinal direction. One end 136A of the coupling cloth 136 in the vehicle width direction adheres to the fixed projection 132E of the partition 132 and the end 134A of the additional bag 134. The other end 136B of the coupling cloth 136 in the vehicle width direction adheres to the fixed projection 134D of the additional bag 134 and the end 134A of the additional bag 134. In this way, a space between the fixed projection 134D and the fixed projection 132E is sealed by the coupling cloth 136. The fixed projections 134D, the fixed projections 132E, and the coupling clothes 136 are each provided in one pair in the vehicle longitudinal direction, and the upper ends thereof are sewn along the vehicle width direction. In addition, as illustrated in FIG. 18, the end 134B of the additional bag 134 is sewn to the upper end 132D of the partition 132.

The partition rolling core 38 is provided between a set of the fixed projections 134D, the fixed projections 132E, and the coupling clothes 136 located on the vehicle front side and a set of the fixed projections 134D, the fixed projections 132E, and the coupling clothes 136 located on the vehicle rear side (see FIG. 20). The upper end 132D of the partition 132 is locked to this partition rolling core 38. In addition, the gas from the inflator 72 (see FIG. 4) can be supplied into the partition 132 and the additional bags 134 from the injection holes 38A (see FIG. 4) of the partition rolling core 38 (see arrows in FIG. 20).

(Action and Effects of Fifth Embodiment) Next, a description will be made on action and effects of the fifth embodiment.

Also, in the above configuration, the occupant protective apparatus is configured to be the same as the occupant protective apparatus 10 in the first embodiment except for the point that the partition 132 is provided with the additional bags 134. Thus, the same effects as those in the first embodiment can be obtained. In addition, the additional bag 134 is provided in the partition upper portion 132A of the partition 132, and the additional bag 134 has a separate structure that is inflated to be thickened in the vehicle longitudinal direction when being supplied with the gas from the inflator 72. Accordingly, it is possible to increase a vehicle longitudinal dimension of a portion that corresponds to the partition upper portion 132A during the inflation. As a result, the sufficient shock absorbing stroke can be secured, and thus it is possible to further effectively absorb the collision load applied to the head H of the occupant P. In this way, the occupant P can appropriately be restrained with the simple configuration.

Figure 21:
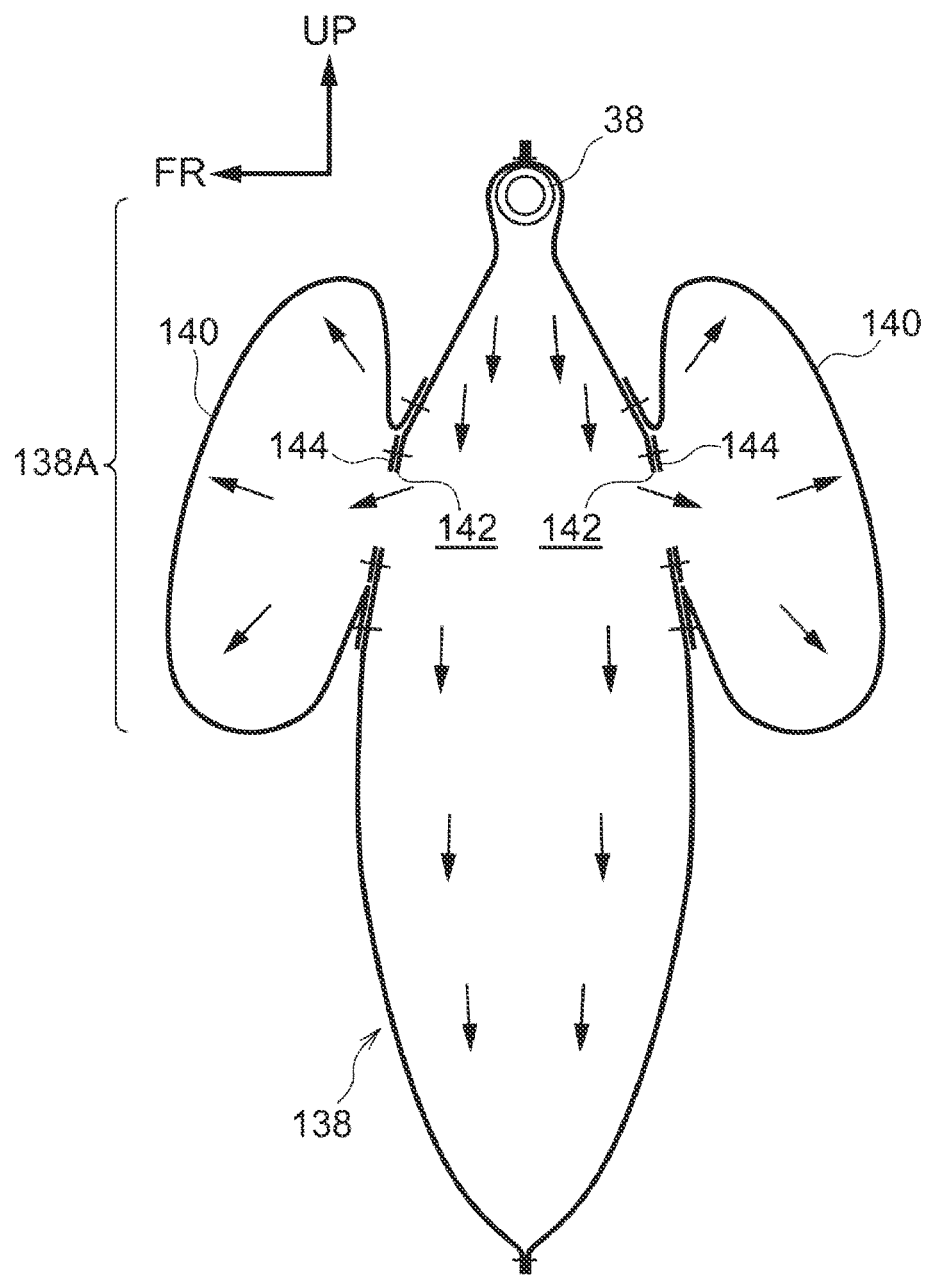
FIG. 21 is an enlarged cross-sectional view illustrating a first modified embodiment of the fifth embodiment and corresponding to FIG. 20.

In the above-described embodiment, the additional bag 134 is configured to be attached to the partition 132 via the fixed projection 134D and the coupling cloth 136. However, an applicable embodiment of the present disclosure is not limited thereto. As illustrated in FIG. 21, it may be configured that additional bags 140 are sewn to a partition upper portion 138A of a partition 138. More specifically, in the vehicle longitudinal direction, the partition 138 is provided with a pair of rectangular cloth members (base fabrics), each of which has the vehicle longitudinal direction as a thickness direction and has the vehicle vertical direction as a longitudinal direction. Outer circumferential ends of the cloth members are sewn to each other. In this way, the partition 138 is formed in the bag shape. The partition upper portion 138A of the partition 138 is provided with a pair of a gas outlet port 142, which penetrates the partition upper portion 138A in the vehicle longitudinal direction, and a reinforcing member 144, which reinforces an outer circumference the gas outflow port 142. Each of the additional bags 140 is sewn to the partition upper portion 138A so as to cover the gas outflow port 142. Accordingly, unlike a configuration that the additional bag is provided inside the partition 138, the inflation of the additional bag itself is not restricted by the partition 138. Thus, when the inflator 72 (see FIG. 4) is actuated, the gas is supplied into the partition 138 and the additional bags 140 (see arrows in FIG. 21). As a result, it is possible to increase a vehicle longitudinal dimension of a portion that corresponds to the partition upper portion 138A during the inflation.

Figure 22:
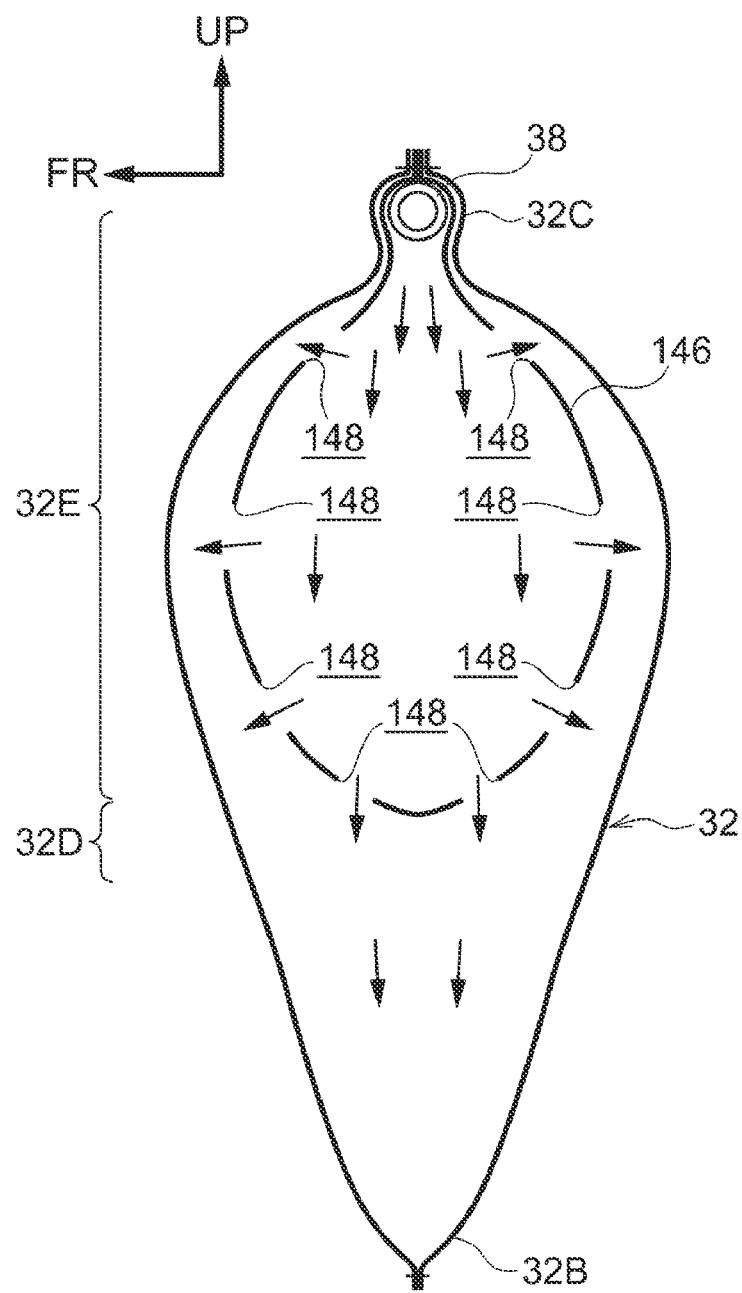
FIG. 22 is an enlarged cross-sectional view illustrating a second modified embodiment of the fifth embodiment and corresponding to FIG. 20.

In addition, as illustrated in FIG. 22, it may be configured that an additional bag 146 is provided inside the partition 32. More specifically, the additional bag 146 is provided in a partition upper portion 32E that is a portion of the partition 32 located on the vehicle upper side of a substantially center portion 32D in the vehicle vertical direction during the inflation of the partition 32. This additional bag 146 is provided with the partition rolling core 38 in an upper end thereof, and is formed with a plurality of gas outflow ports 148. Accordingly, after being supplied into the additional bag 146, the gas from the inflator 72 (see FIG. 4) is then supplied into the partition 32. In this way, it is possible to increase a vehicle longitudinal dimension of a portion corresponding to the partition upper portion 32E during the inflation. The additional bag 146 is provided inside the partition 32. Thus, compared to a configuration that the additional bag is provided on a surface of the partition 32, the partition 32 can smoothly be rolled around the partition rolling core 38 in the normal time when the partition 32 is not inflated.

Furthermore, in the above-described fifth embodiment, it is configured that the pair of the additional bags 134, 140, or 146 is provided in the vehicle longitudinal direction. However, an applicable embodiment of the present disclosure is not limited thereto. It may be configured that the additional bag 134, 140, or 146 is provided only on one of the sides in the vehicle longitudinal direction.

Furthermore, in the first embodiment to the fifth embodiment described above, the vehicle 12 is the automated driving vehicle. However, an applicable embodiment of the present disclosure is not limited thereto, and may be applied to a manual driving vehicle. In this case, it is desirably configured that the partition 32, 92, 102, 122, 132, or 138 is provided for vehicle seats other than a driver's seat, such as in a space between second-row seats and third-row seats. Such vehicle seats can be arranged to oppose each other.

The partition drive mechanism 36 is configured to detect the angle θ and consequently stops the rotation of the motor 46. However, an applicable embodiment of the present disclosure is not limited thereto. It may be configured that the occupant P visually checks the state of the partition 32 and turns OFF the operation switch 62 when necessary, so as to stop the motor 46. In addition, it may be configured that the motor 46 is provided with a rotation speed sensor and is stopped on the basis of the detected rotation speed of the motor 46.

Each of the partitions 32, 92, 102, 122, 132, 138 is configured to be supplied with the gas from the injection holes 38A formed in the partition rolling core 38. However, an applicable embodiment of the present disclosure is not limited thereto. It may be configured that the inflator 72 is provided therein and directly supplies the gas during the collision of the vehicle. It may be configured that the inflator 72 is provided inside the partition rolling core 38. A configuration other than the above may be adopted.

Each of the partitions 32, 92, 102, 122, 132, 138 and each of the additional bags 134, 140, 146 are configured to be in the bag shape by sewing the outer circumferential end of the cloth member (the base fabric). However, an applicable embodiment of the present disclosure is not limited thereto. It may be configured that each of the partitions 32, 92, 102, 122, 132, 138 and each of the additional bags 134, 140, 146 are integrally woven as a bag by a one piece woven method abbreviated as OPW.

As the example, the vehicle seat 16 is configured that the vehicle seat 16 can be brought into the comfortable state, where the seat back is reclined significantly, or the relaxing state, where the vehicle seat is slid to the secure sufficient legroom. However, an applicable embodiment of the present disclosure is not limited thereto. The occupant protective apparatus 10, 90, 100, 120, or 130 may be applied to a vehicle having a vehicle seat that is integrally fixed to a vehicle body and is prevented from being reclined and/or slid.

The description has been made so far on the embodiments of the present disclosure. However, an applicable embodiment of the present disclosure is not limited to the above, and it is needless to say that various modifications can be made thereto for implementation within the scope that does not depart from the gist of the present disclosure.

What is claimed is:

1. An occupant protective apparatus comprising:
   a collision detection sensor that detects a collision of a vehicle;
   an inflator that is actuated to supply gas when the collision detection sensor detects the collision of the vehicle; and
   a partition that is provided in a cabin and provided between a pair of vehicle seats arranged to oppose each other in a vehicle longitudinal direction, that is selectively brought into a shielding state, in which the partition extends from an upper portion to a lower portion of the cabin in such a manner as to partition a space between the pair of the vehicle seats, and a non-shielding state, in which the partition is stored in a specified position, and that is supplied with the gas from the inflator and inflated to be thickened in the vehicle longitudinal direction when being in the shielding state during the collision of the vehicle, the partition in the non-shielding state being stored in a state of being rolled around a partition rolling core that is provided on a ceiling of the cabin and formed in a cylindrical shape, the partition rolling core formed with a plurality of injection holes, and the gas from the inflator supplied into the partition via the injection holes.

2. The occupant protective apparatus according to claim 1, wherein
   the vehicle is provided with a collision prediction sensor that predicts the collision of the vehicle, and
   in the case where the partition is in the non-shielding state when the collision prediction sensor predicts the collision of the vehicle, the partition is brought into the shielding state more promptly than in a normal time.

3. The occupant protective apparatus according to claim 1, wherein
   the partition is set such that a vehicle longitudinal dimension of a partition upper portion, which constitutes a portion on a vehicle upper side of a substantially center portion in a vehicle vertical direction in the shielding state, is larger than that of a partition lower portion, which constitutes a portion on a vehicle lower side of the substantially center portion in the vehicle vertical direction in the shielding state.

4. The occupant protective apparatus according to claim 3, wherein
   the partition upper portion is provided with an additional bag that has a separate structure and is inflated to be thickened in the vehicle longitudinal direction when being supplied with the gas from the inflator.

5. The occupant protective apparatus according to claim 3, wherein
   the partition upper portion and the partition lower portion are provided with a plurality of uninflated sections, each of which extends in the vehicle vertical direction and is not supplied with the gas from the inflator during inflation, and
   the number of the uninflated sections provided in the partition upper portion is set to be smaller than the number of the uninflated sections provided in the partition lower portion.

6. The occupant protective apparatus according to claim 5, wherein
   a communicating section that extends in a vehicle width direction and is inflated when being supplied with the gas from the inflator is provided on each side of the uninflated sections in the vehicle vertical direction during the inflation of the partition.

7. The occupant protective apparatus according to claim 3, wherein
   each of the partition upper portion and the partition lower portion is provided with a plurality of uninflated sections, each of which extends in the vehicle vertical direction and is not supplied with the gas from the inflator during inflation, and
   the uninflated sections provided in the partition upper portion and the partition lower portion are arranged in line in the vehicle vertical direction during the inflation.

8. The occupant protective apparatus according to claim 1, wherein
   an exterior skin is locked to a surface of the partition via a locking section, and
   the locking section cancels a locked state between the exterior skin and the partition during the inflation of the partition.

9. The occupant protective apparatus according to claim 1, wherein
   a vehicle lower end of the partition in the shielding state is held by a floor of the cabin.

10. The occupant protective apparatus according to claim 1, wherein
    the partition can be stored in a case that extends in a seat width direction, and
    the case is attached to a vehicle body framework at plural positions in a longitudinal direction of the case.

11. An occupant protective apparatus comprising:
    a collision detection sensor that detects a collision of a vehicle;
    an inflator that is actuated to supply gas when the collision detection sensor detects the collision of the vehicle;
    a partition that is provided in a cabin and provided between a pair of vehicle seats arranged to oppose each other in a vehicle longitudinal direction, that is selectively brought into a shielding state, in which the partition extends from an upper portion to a lower portion of the cabin in such a manner as to partition a space between the pair of the vehicle seats, and a non-shielding state, in which the partition is stored in a specified position, and that is supplied with the gas from the inflator and inflated to be thickened in the vehicle longitudinal direction when being in the shielding state during the collision of the vehicle; and
    an exterior skin locked to a surface of the partition via a locking section, the locking section canceling a locked state between the exterior skin and the partition during the inflation of the partition.

12. The occupant protective apparatus according to claim 11, wherein
the vehicle is provided with a collision prediction sensor that predicts the collision of the vehicle, and
in the case where the partition is in the non-shielding state when the collision prediction sensor predicts the collision of the vehicle, the partition is brought into the shielding state more promptly than in a normal time.

13. The occupant protective apparatus according to claim 11, wherein
the partition is set such that a vehicle longitudinal dimension of a partition upper portion, which constitutes a portion on a vehicle upper side of a substantially center portion in a vehicle vertical direction in the shielding state, is larger than that of a partition lower portion, which constitutes a portion on a vehicle lower side of the substantially center portion in the vehicle vertical direction in the shielding state.

14. An occupant protective apparatus comprising:
a collision detection sensor that detects a collision of a vehicle;
an inflator that is actuated to supply gas when the collision detection sensor detects the collision of the vehicle; and
a partition that is provided in a cabin and provided between a pair of vehicle seats arranged to oppose each other in a vehicle longitudinal direction, that is selectively brought into a shielding state, in which the partition extends from an upper portion to a lower portion of the cabin in such a manner as to partition a space between the pair of the vehicle seats, and a non-shielding state, in which the partition is stored in a specified position, and that is supplied with the gas from the inflator and inflated to be thickened in the vehicle longitudinal direction when being in the shielding state during the collision of the vehicle, the partition set such that a vehicle longitudinal dimension of a partition upper portion, which constitutes a portion on a vehicle upper side of a substantially center portion in a vehicle vertical direction in the shielding state, is larger than that of a partition lower portion, which constitutes a portion on a vehicle lower side of the substantially center portion in the vehicle vertical direction in the shielding state, the partition upper portion and the partition lower portion provided with a plurality of uninflated sections, each of which extends in the vehicle vertical direction and not supplied with the gas from the inflator during inflation.

15. The occupant protective apparatus according to claim 14, wherein
the number of the uninflated sections provided in the partition upper portion is set to be smaller than the number of the uninflated sections provided in the partition lower portion.

16. The occupant protective apparatus according to claim 14, wherein
the uninflated sections provided in the partition upper portion and the partition lower portion are arranged in line in the vehicle vertical direction during the inflation.

* * * * *